(12) United States Patent
Suga

(10) Patent No.: US 8,000,472 B2
(45) Date of Patent: Aug. 16, 2011

(54) INFORMATION ENCRYPTION APPARATUS AND CONTROLLING METHOD OF THE SAME, COMPUTER PROGRAM AND COMPUTER READABLE STORAGE MEDIUM

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 11/614,556

(22) Filed: Dec. 21, 2006

(65) Prior Publication Data

US 2008/0152133 A1    Jun. 26, 2008

Related U.S. Application Data

(63) Continuation of application No. PCT/JP2005/016365, filed on Aug. 31, 2005.

(30) Foreign Application Priority Data

Sep. 1, 2004    (JP) .................................. 2004-254681

(51) Int. Cl.
    *H04L 9/00*    (2006.01)
(52) U.S. Cl. .......................................... 380/45; 380/40
(58) Field of Classification Search .............. 380/40, 380/42, 43, 45
    See application file for complete search history.

(56) References Cited

U.S. PATENT DOCUMENTS

| | | | | |
|---|---|---|---|---|
| 5,483,598 | A | * | 1/1996 | Kaufman et al. ............... 380/43 |
| 5,708,717 | A | * | 1/1998 | Alasia ............................ 380/51 |
| 5,809,202 | A | * | 9/1998 | Gotoh et al. .................. 386/241 |

(Continued)

FOREIGN PATENT DOCUMENTS

EP    1278330 A1    12/2004

(Continued)

OTHER PUBLICATIONS

Toshihisa Nakano et al., "Key Management System for Digital Content Protection" Encryption and Information Security Symposium SCIS 2001, Oiso, Japan, Jan. 23-26, 2001, pp. 213-218.

(Continued)

*Primary Examiner* — Kimyen Vu
*Assistant Examiner* — Sayed Beheshti Shirazi
(74) *Attorney, Agent, or Firm* — Fitzpatrick, Cella, Harper & Scinto

(57) ABSTRACT

The present invention stores and manages only one piece of key information even if contents information includes a plurality of partial contents arranged in a sequence, and the partial contents are encrypted with different keys. When a piece of contents information includes four partial contents or divided into four partial contents, a key for each of four node positions is generated through four steps of operations from a key for the top root. Node keys P (i, 1) and P (i, i) at both sides are generated by a one-way function from node keys P (i−1, 1) and P (i−1, i−1) at the upper i−1$^{th}$ layer, and a node key P (i, m) (m=2, 3, . . . , i−1) are generated by a one-way function which can generate the keys from any of node keys P (i−1, m−1) and P (i−1, m) at the upper i−1$^{th}$ layer, where j$^{th}$ node key at the i$^{th}$ layer is represented as P (i, j) (j=1, 2, . . . , i−1). Then, each of partial contents is encrypted with key information generated at a terminal layer. If only a root key is saved, one encrypting key can be generated for a range of partial contents arranged in a sequence.

3 Claims, 25 Drawing Sheets

U.S. PATENT DOCUMENTS

| | | | |
|---|---|---|---|
| 6,598,161 B1* | 7/2003 | Kluttz et al. | 713/166 |
| 7,043,024 B1* | 5/2006 | Dinsmore et al. | 380/278 |
| 7,136,840 B2* | 11/2006 | Pinkas et al. | 705/75 |
| 7,356,148 B2* | 4/2008 | Hayashi | 380/281 |
| 2003/0185399 A1 | 10/2003 | Ishiguro | 380/281 |
| 2004/0022521 A1* | 2/2004 | Kishi et al. | 386/69 |
| 2004/0143732 A1* | 7/2004 | Choi et al. | 713/151 |
| 2004/0153674 A1* | 8/2004 | Hayashi | 713/202 |
| 2004/0170277 A1 | 9/2004 | Iwamura et al. | |
| 2004/0174999 A1* | 9/2004 | Iwamura et al. | 380/277 |
| 2004/0196972 A1* | 10/2004 | Zhu et al. | 380/45 |
| 2006/0101267 A1 | 5/2006 | Takamura et al. | 713/171 |
| 2006/0149762 A1 | 7/2006 | Suga et al. | |
| 2007/0033430 A1* | 2/2007 | Itkis et al. | 714/6 |
| 2007/0058803 A1 | 3/2007 | Suga | |
| 2007/0136599 A1 | 6/2007 | Suga | |

FOREIGN PATENT DOCUMENTS

| | | |
|---|---|---|
| JP | 2002-156905 | 5/2002 |
| JP | 2004-120008 | 4/2004 |
| JP | 2004-140667 | 5/2004 |
| WO | WO 02/080448 | 10/2002 |
| WO | WO 2004-028073 | 4/2004 |

OTHER PUBLICATIONS

"Dynamic Key management schemes for access control in a hierarchy" Computer Communications, 20:1381-1385, 1997.

J.-C. Birget, X. Zou, G. Noubir, B. Ramamurthy, "Hierarchy-Based Access Control in Distributed Environments" in the Proceedings of IEEE ICC, Jun. 2001.

* cited by examiner

FIG. 18
{k1,k2,k3,k4,k5,k6}
{k2,k4,k5}  {k3, k5, k6}
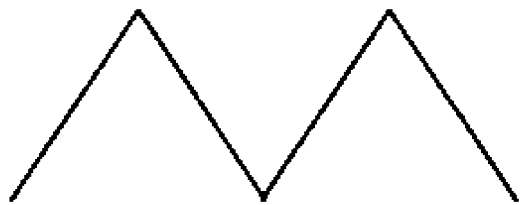
{k4}   {k5}   {k6}

FIG. 25

| PARENT KEY INFORMATION |
| --- |
| NUMBER OF CHILDREN KEYS |
| CONTENTS DIVIDING INFORMATION |
| RANGE FOR DECRYPTION INFORMATION |

INFORMATION ENCRYPTION APPARATUS AND CONTROLLING METHOD OF THE SAME, COMPUTER PROGRAM AND COMPUTER READABLE STORAGE MEDIUM

TECHNICAL FIELD

The present invention relates to a technique of encrypting contents information to be delivered.

BACKGROUND ART

With transfer rates of communication lines being increased and large capacity recording media such as DVDs being used, more and more digital contents including documents or image data are being communicated these days. The digital contents delivery service is a service for distributing contents among particular users. It is a matter of course that the service needs a system for preventing the contents from being leaked to entities other than the authorized users. For the contents delivery service using a large capacity medium, similar mechanisms for controlling access by users are also being developed. For such a mechanism, a system is provided for a situation where contents data is encrypted or scrambled to allow only authenticated users who have correct contents information or know a way for descrambling the contents to decrypt the contents data and to enjoy the authorized contents including a document and image data.

Such a contents delivery service has contents providers to deliver contents. The contents providers have to set different access control information for each of the contents and are expected to perform encryption with different key on each of the contents, each user and each action of the users (for example, viewing or copying the contents). The contents providers suffer significant loads in managing key information such as generating, holding or delivering keys. To solve this problem, key management methods that are more efficient without degrading the level of security have been studied. Some of the conventional management methods will be described below.

[Tree Structure Management Method]

The tree structure management method is suitable for rejecting a user and is used in offline contents replaying appliances such as a DVD player. In this method, key information used for encryption and the encrypted contents are concurrently delivered or stored in a medium so that only an authenticated user can decrypt the encrypted data. The key information has to be delivered in an appropriate combination to each user. A tremendous amount of user key information can be efficiently managed with the tree structure.

The three indicators below determine the efficiency of a method of the tree structure management methods:
1) a data size of key information to be delivered concurrently with the contents
2) a data size of previously delivered key information, which holds a user
3) a data size of key information required to be managed by a contents provider In an online delivery service, 1) counts most as 1) determines the network traffic. From the view of contents providers, however, 3) counts most as 3) refers to its management cost. It should be noticed that the indicators' weights vary among situations.

A typical tree structure management method is a contents delivery model described in the document "Management methods for protecting digital contents" encryption and information security symposium SCIS2001, pp. 213-218 (hereinafter called Document 1). In this model, a tree structure for delivering keys as shown in FIG. 14 is used, with different keys being placed at respective nodes. A user key (in the above paper, a key held by a player such as a DVD is considered) is considered as the same as a terminal node (leaf node) and is assumed to hold key data for all the nodes from the root to the terminal node. In this model, the contents are assumed to be updated frequently and keys are thus placed so as to improve efficiency of key revocation.

[Hierarchical Key Management Method]

Key management considered in the hierarchical key management method is the same as that in the tree structure management method in that keys are placed at respective nodes but quite different in that a user is provided with not only a key placed at a terminal node but also keys placed at all the nodes including the root. Documents disclosing this technique include C. H. Lin. "Dynamic key management schemes for access control in a hierarchy" Computer Communications, 20:1381-1385, 1997 (hereinafter called Document 2) and J.-C. Birget, X. Zou, G. Noubir, B. Ramamurthy, "Hierarchy-Based Access Control in Distributed Environments" in the Proceedings of IEEE ICC, June 2001 (hereinafter called Document 3).

In this method, instead of a structure of n-ary trees as shown in FIG. 14, an access structure as shown in FIGS. 15 and 16 is used with some local places having a relationship such as shown in FIG. 17. In this case, the method must have a system for allowing a key for the node n3 to be generated from both a key placed at the node n1 and a key placed at the node n2. The abovementioned paper by Birget and others (Document 3) proposes two methods shown below as a method for providing such a system.

[(1) User Multiple Keying]

This is a method for making each node hold a plurality of keys with a parent node being adapted to hold all the keys for children nodes. FIG. 18 shows an example of this method, describing a set of key data to be delivered to each node. For example, the figure shows that key data k5 is included in the parent node of a node, to which {k5} is delivered. The figure also shows that it is the same in the other nodes that parent nodes include key data of their children nodes.

[(2) One-Way Function Based Keying Schemes]

This is a method in which what was proposed by Lin and the others (Document 2) is extended. This method uses a one-way hash function to reduce key information held by each node. When key data of a child node is generated from key data of a plurality of parent nodes as shown in FIG. 17, the operations shown below are required. The operations will be described with reference to FIG. 19.

In FIG. 19, in order to generate key data k3 from key data k1 or k2, computations below are performed:

$$k3:=F(k1,n3) \text{XOR } r13$$

$$k3:=F(k2,n3) \text{XOR } r23$$

Here, XOR refers to an exclusive OR for each bit. F( ) is a one-way hash function to be described later in detail. n3 is an identifier of a node, to which key data k3 is associated, and r13 and r23, both of which are public data, are random data which is associated with node n1 (key data k1) via node n3 and which is associated with node n2 (key data k2) via node n3, respectively.

The function f( ) is configured by $F(k\_i, n\_j) = g^{\{k\_i + n\_j\}} \bmod p$ (p is a prime and g is a generator). The abovementioned r12 and r13 are generated to satisfy $$F(k1,n3) \text{XOR } r13 = F(k2,n3) \text{XOR } r23.$$

[Delivery of Time Sequential Image Contents]

As an application of the abovementioned key generating method, an image encrypting/decrypting system for encrypting and sending contents data such as an image configured by a plurality of frame images in a series in chronological order at a contents creating side and decrypting and replaying the sent contents data at a user's side is considered (for example, Japanese Patent Laid-Open No. 2002-156905 (Document 4)).

FIG. 7 is a schematic diagram for illustrating a case where time sequential contents are encrypted for each unit. At a contents creating side, object contents 701 is encrypted into encrypted contents 702. The contents 701 are divided into parts from M1 to M4, which are encrypted by contents keys 703 (k1)-706 (k4) respectively resulting in the encrypted data c1-c4. At a user's side, all or a part of the contents keys from k1 to k4 are secretly received and the encrypted part of the contents keys is decrypted. The contents keys 703-706 may be delivered concurrently with the encrypted contents 702, or may be separately delivered in an asynchronous manner from a license server, which is a third party, different from the deliverer.

Here, the creator of the time sequential contents has to determine the minimum unit of the contents to be encrypted by the same key and generate a key for each of the atomic contents separated by the unit. The creator also has to determine the range to be disclosed to the receiver and deliver a key for the range. If the atomic contents are set for a kind of contents by mesh, both the key information to be managed and the key delivery cost will be tremendous.

It should be noticed that the key management method described in Document 4 encrypts each of the atomic contents with a different key not for the purpose of controlling delivery so that a different range will be shown for each user. In other words, whether the user has a correct key or not depends on whether the user wants to enjoy all the contents or not and the use of different keys does not control partial accessing.

As mentioned above, a creator of time sequential contents can control delivering the contents in further segmented units by determining the minimum unit of contents to be encrypted with the same key, generating a key for each of the atomic contents separated by the unit and encrypting the contents with the respective keys. If the atomic contents are set by segmented mesh, however, both key information to be managed and key delivery cost is tremendous.

DISCLOSURE OF INVENTION

In the view of the abovementioned problems, the present invention intends to provide a technique for facilitating management of key information even if contents information is divided into some partial contents, which are encrypted with different pieces of key information.

In order to solve the problem, the information encrypting apparatus of the present invention includes the configuration below:

An information encrypting apparatus for encrypting contents information including partial contents arranged in a sequence along a predetermined axis, including:

root key generating means for generating root key information of the contents information;

hierarchical structure key generating means for generating i keys of the $i^{th}$ layer based on i-1 keys at an upper $i-1^{th}$ layer and generating key information for the number of the partial contents at a terminal position, wherein the hierarchical structure key generating means generates node keys P (i, 1) and P (i, i) at both sides by a one-way function from node keys P (i-1, 1) and P (i-1, i-1) at the upper $i-1^{th}$ layer, and a node key P (i, m) (m=2, 3, . . . , i-1) by a one-way function which can generate the keys from any of node keys P (i-1, m-1) and P (i-1, m) at the upper $i-1^{th}$ layer, where $j^{th}$ node key at the $i^{th}$ layer is represented as P (i, j) (j=1, 2, . . . , i-1);

encrypting means for encrypting each of partial contents by using key information at a terminal layer generated by the hierarchical structure key generating means; and storing means for storing encrypted contents information including partial contents encrypted by the encrypting means, the root key information and information for determining a boundary position for each of partial contents.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 18 is a diagram for illustrating an example of User multiple keying;

FIG. 25 is a diagram for illustrating a data structure of decrypting information.

BEST MODE FOR CARRYING OUT THE INVENTION

Embodiments according to the present invention will be described in detail below.

First Embodiment

Figure 1:
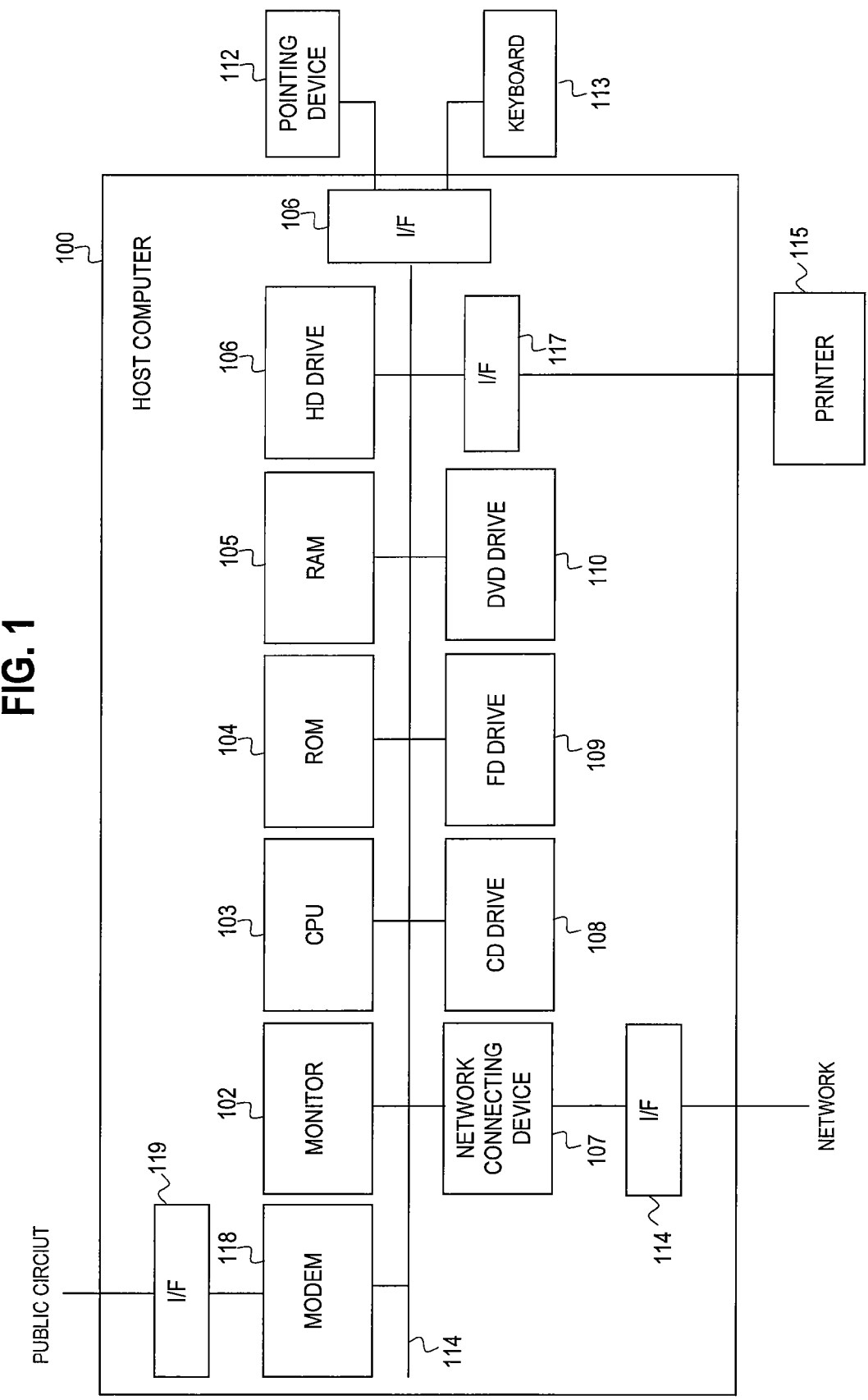
FIG. 1 is a block diagram for illustrating a configuration of a processing unit according to an embodiment.

FIG. 1 is a block configuration diagram of an information processing unit according to the present invention. All the functions shown in FIG. 1 are not necessary to implement the present invention.

As shown in FIG. 1, an information processing unit 100 includes a modem 118 for a public circuit or the like, a monitor 102 as a display part, a CPU 103, ROM 104, RAM 105, an HD (Hard Disk) 106, a network connecting part 107 for a network, a CD drive 108, an FD (Flexible Disk) drive 109, a DVD (Digital Video Disk or Digital Versatile Disk) drive 110, an interface (I/F) 117 for a printer 115, and an interface (I/F) 111 for a pointing device 112 such as a mouse or a keyboard 113 as an operating part, which are communicatively interconnected via a bus 116.

The pointing device 112 and the keyboard 113 are operating parts for a user to input various instructions to the information processing unit 100. Information input through the operating part (operating information) is taken in the information processing unit 100 via the interface 111.

Various types of information (character information, image information or the like) in the information processing unit 100 is adapted to be printed out from the printer 115.

The monitor 102 displays various types of instructing information for a user or various types of information including character information and image information.

The CPU 103 controls over operation of the entire information processing unit 100. The CPU 103 controls over the information processing unit 100 by reading out processing programs (an OS and various application programs) from the HD (Hard Disk) 106 or the like and executing them. Particularly in the embodiment, the CPU 103 performs the information processing to be described later by reading out processing programs (corresponding to software in the embodiment) for achieving key generation from the HDD 106 or the like and executing the programs. The HDD 106 stores processing programs for generating a key and various types of data to be used in the programs (a graph for generating a key or the like) or the like.

The ROM 104 stores a BIOS and a boot program. The RAM 105 is used as a working area for temporally storing processing programs and information on what is to be processed for various processes in the CPU 103.

The HD 106 is an exemplary component of a mass storage device, saving an OS, various application program files (including processing programs in the embodiment), a data file, or processing programs for information converting processing or the like, which are transferred to the RAM 105 or the like when the respective processes are performed.

The CD drive 108 has functions of reading data stored in a CD (CD-R) as an example of an external memory and writing out data to the CD.

The FD (Floppy (registered trademark) (R) disk) drive 109 reads data stored in a FD as an example of an external memory as the CD drive does. The FD drive also has a function of writing various types of data to the FD.

The DVD (Digital Video Disk) drive 110 has functions of reading data stored in a DVD as an example of external memory and writing data in the DVD as the CD drive 108 or FD drive 109 does.

The information processing unit 100 may be adapted to install an editing program or a printer driver on the HD 106 and transfer the programs to the RAM 105 if needed, when the programs are stored in external memory such as the CD, the FD and the DVD.

The interface (I/F) 111 is for receiving an input from a user via the pointing device 112 or the keyboard 113.

The modem 118 is a communication modem and connected to an external network though a public circuit or the like for example, via the interface (I/F) 119.

The network connecting part 107 is connected to an external network via an interface (I/F) 114.

Generation and management of a key in the abovementioned configuration of an apparatus will be described below.

[Hash Key Management Method]

(1) [User multiple keying] of the conventional hierarchical key management method has a problem in that the amount of key data to be held increases as the hierarchies increases, i.e., in proportion to the total number of nodes, for each node has to hold many keys.

(2) [One-way function based keying schemes] uses a one-way hash function and reduces the amount of key data to be held at each node, though it also has a problem in that the amount of data to be held increases as the hierarchies increases like the case of (1), for public random data such as r12 and r13 have to be held separately. (2) uses a exponential calculation for the one-way hash function. (2) has tremendous amount of calculations as it includes calculations requiring a power method in any case even if (2) may include a trapdoor hash function. Particularly in a device with a little resource for calculations for a PDA or the like, much time is spent in calculating a key, which may risk interactive processing in decrypting data. A key management method with less calculations and the same access structure is needed to solve this problem.

[Outline of Key Generation]

Figure 3:
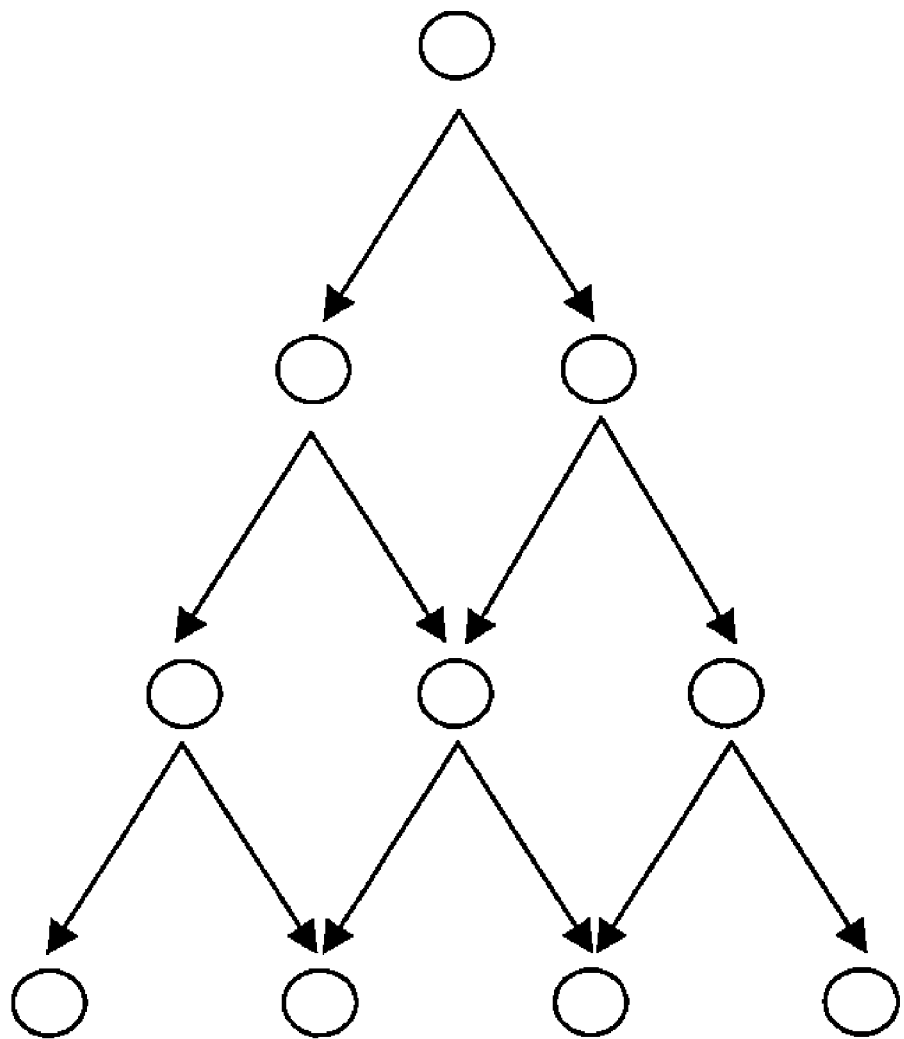
FIG. 3 is a diagram for illustrating an example of a directed graph representing an access structure.

Generation of a node key at each node by the hash key management method will be shown below. The access structure, which is the object of the key management, is represented by a directional graph where hierarchical relationship has no loop nor cycle as shown in FIG. 3.

[Division of Nodes]

Nodes are divided to fulfill the condition below in the given key delivery graph G in order to generate key generating data. Here, a set of all the nodes is denoted by Node (G), the size of a set of subsets is denoted by N and divided subsets are denoted by $SubG\_1, SubG\_2, \ldots SubG\_N$.

$$SubG\_1 \cup SubG\_2 \cup \ldots \cup SubG\_N = Node(G)$$

All the subsets cover all the nodes.

n_a<n_b or n_a>n_b is held in arbitrary two different nodes n_a and n_b included in SubG_i. That is to say, n_a and n_b have a parent-child relationship, such as one being the child node of the other.

The number of divided subsets N is called key delivery order of the key delivery graph G, represented by Ord (G).

[Assignment of Node Keys]

An initial key K_i is calculated for each subset SubG_i ($1 \leq i \leq N$) and assigned as a node key for the root node. Node keys are assigned to children nodes subordinate to the root node in the rules shown below:

i) Respective nodes are numbered by the numbers associated with N initial keys K_i ($1 \leq i \leq N$). The numbers represent how many times the one-way function is performed on the respective initial keys K_i. "N" meaning "None" may be numbered. If a node is numbered "N" for an initial key K_i, the node has no key associated with the initial key K_i.

ii) Nodes included in SubG_i are sorted in descending order according to the parent-child relationship on a directed graph in each set and numbered in ascending order from 0. The numbers are associated with the initial keys K_i.

iii) The number associated with the initial key K_j ($i \neq j$) for a node included in SubG_i is "N", if the node is not the ancestor node of nodes included in SubG_j (a subset to the initial key K_j). The number is the minimum number among what assigned to nodes included in SubG_j as children nodes, if the node is the ancestor node.

Figure 2:
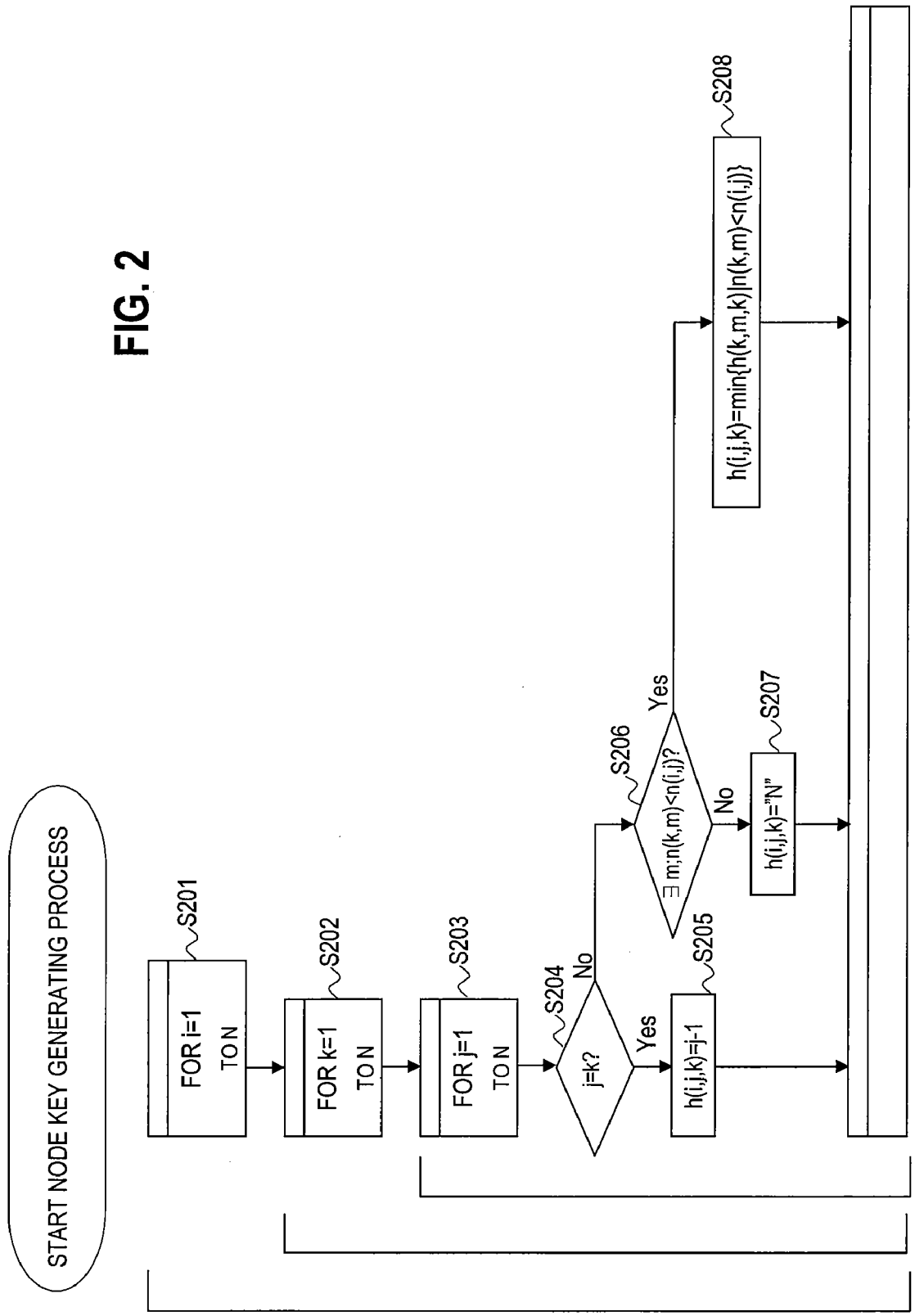
FIG. 2 is a flowchart for illustrating a node key generating procedure according to a hash key generating method.

FIG. 2 is a flowchart of the abovementioned node key assigning process. Here, it is considered that all the nodes in a set are mutually prime and divided into subsets, which are not empty, {SubG_i} {$1 \leq i \leq N$}, and initial keys K_i are calculated for respective subsets.

The number of nodes included in each of the subsets SubG_i is described as #N (i). The nodes included in each of the subsets SubG_i are sorted in descending order according to the parent-child relationship on the directed graph, and described as SubG_i={n (i, 1), n(i, 2), . . . , n (i, #N(i))}. The node key for node n (i, j) is what the one-way hash function is performed on an initial key K_k ($1 \leq k \leq N$) for predetermined time. The predetermined time is described as h (i, j, k).

Step S201 is a loop for a variable i varying from 1 to N, step S202 is a loop for a variable j varying from 1 to N, and step S203 is a loop for a variable k varying from 1 to #N (i).

At step S204, whether the variables i and k match or not is evaluated. If they match, the process proceeds to step S205. If they do not match, the process proceeds to step S206. j−1 is substituted into h (i, j, k) at step S205 and the process returns to the start of the loop.

At step S206, the presence of m, which fulfills n (k, m)<n (i, j), i.e., n (i, j) is the ancestor node of n (k, m) is evaluated. If m is not present, the process proceeds to step S207. If m is present, the process proceeds to step S208. "N" is substituted into h (i, j, k) at step S207 and the process returns to the start of the loop.

At step S208, min {h (k, m, k)|n (k, m)<n (i, j)} is substituted into h (i, j, k), i.e., the minimum value of h (k, m, k) among nodes, where n (i, j) is the ancestor node of n (k, m), is substituted into h (i, i, k), and the process returns to the start of the loop.

This key generating method is adapted to fulfill the two requirements below:

a) Ability of generation: an object node can generate the key for its grandchild node.

b) Protect against collusion attacks: Even if entities at two or more arbitrary nodes work together (unless the one-way function becomes fragile), a key for the ancestor node upper than the respective nodes cannot be generated.

Figure 4:
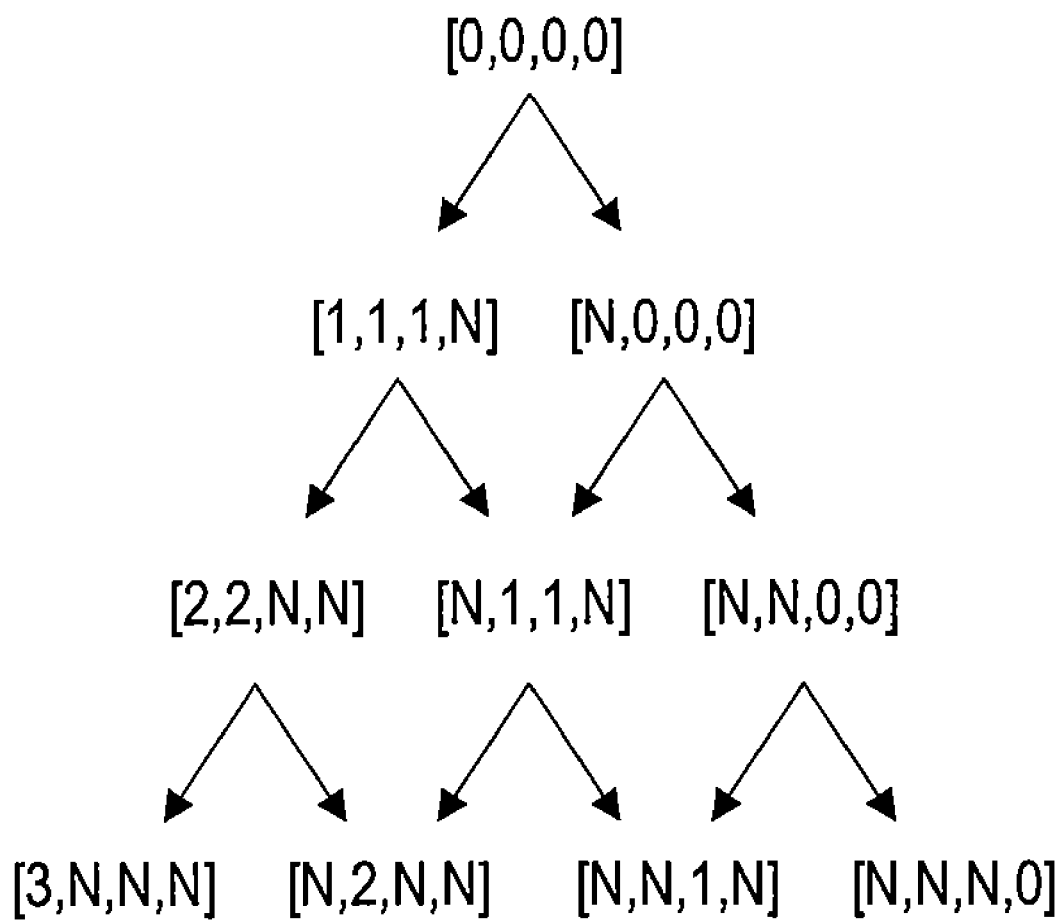
FIG. 4 is a diagram for illustrating an example of a node key assigning chart for the example shown in FIG. 3.

With these conditions, a hierarchical key management method for allowing key generation and key delivery in a safe manner can be achieved. As an example, node keys as shown in FIG. 4 are configured for the directed graph shown in FIG. 3. A vector of each node shown in FIG. 4 represents how many times the hash function is performed on four initial keys x, y, z and t. For example, a cell described as [2, 2, N, N] is assumed to hold H (H (x)) and H (H (y)) as node keys. "N" refers to "None", meaning that the node has no information on initial keys z and t. If a hash operation is to be performed for n times thereafter, it is briefly described as H^n ( ). According to this notation, a cell described as [2, 2, N, N] has two node keys of H^2 (x) and H^2 (y).

[Key Delivery]

A key delivery method by a root key deliverer (an entity of the root node) to each node and a key delivery method by an entity holding individual key other than the root key deliverer to lower nodes will be described below respectively.

First, the root key deliverer generates parameter(s) {x_i} ($1 \leq i \leq$ Ord (G)) in the number of key delivery order Ord(G), which is determined by a key delivery graph (G), randomly and safely and makes them its own individual keys. The deliverer places a plurality of keys to respective nodes according to the abovementioned key generating procedure. The root key deliverer safely delivers a key for each node to an entity at each node. Alternatively, the deliverer discloses a key delivery graph and delivers data for identifying the delivered key's location on the graph to each entity.

As a subspecies of more efficient hash key delivery method, a pruning method is known.

[Outline of Pruning Method]

When a node division {SubG_i} ($1 \leq i \leq m$) is given to the directed graph G, an algorithm for calculating a node-keys-assigning chart M (G) representing key generation uses the conventional technique of the hash key generating method. The calculation algorithm is described as Π: G→M (G). In M (G), each node key is represented by m vector(s), which describe node key information for each node represent the size of node division {SubG_i} ($1 \leq i \leq m$). It represents how many times the hash function is performed on an initial key as mentioned above.

The given directed graph G is divided and Π is performed on each of the divided sub-graphs G_i to obtain Π (G_i)=M (G_i). The directed graph G is divided so that sub-graphs fulfill the conditions below:

1) Each sub-graph has one root node.

2) If a root node of a sub-graph is not a root of the original graph G, it is a node of another sub-graph.

Figure 5:
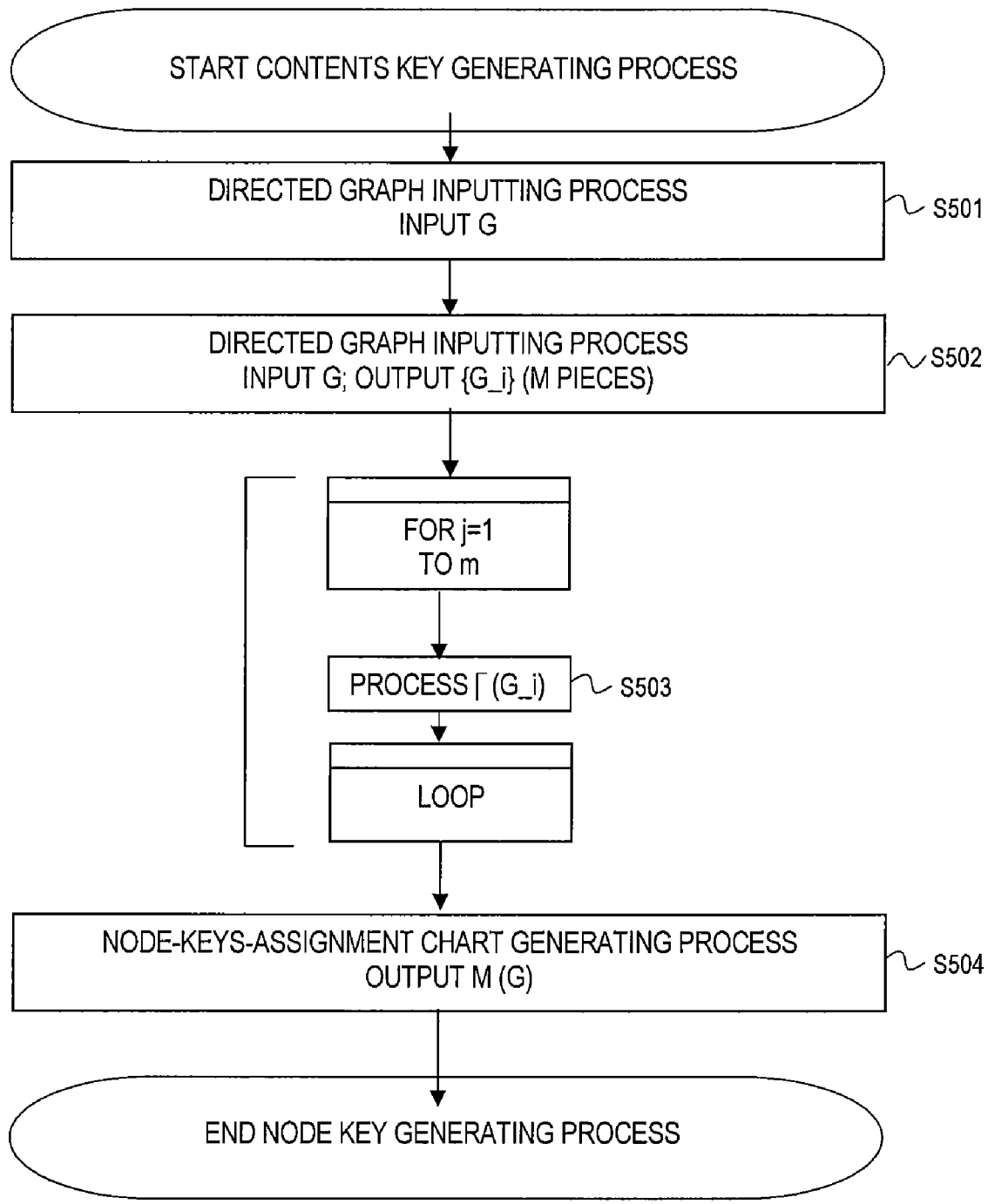
FIG. 5 is a flowchart for illustrating a node key generating procedure according to a pruning method.

FIG. 5 shows a flowchart of the above-mentioned processing. At step S501, a directed graph G representing an access structure is input. At step S502, a graph division is performed and {G_i} ($1 \leq i \leq m$) is obtained. At step S503, the algorithm Π is performed on each of the obtained sub-graphs G_i and each node-keys-assigning chart M (G_i) is calculated. Finally at step S504, M (G_i) is merged into M (G). M (G) can be represented as the same as the conventional node-keys-assignment chart, though, it is different in that the size of a vector varies for each sub-graph and a label for indicating a node associating the upper node and the lower node is required.

Figure 6:
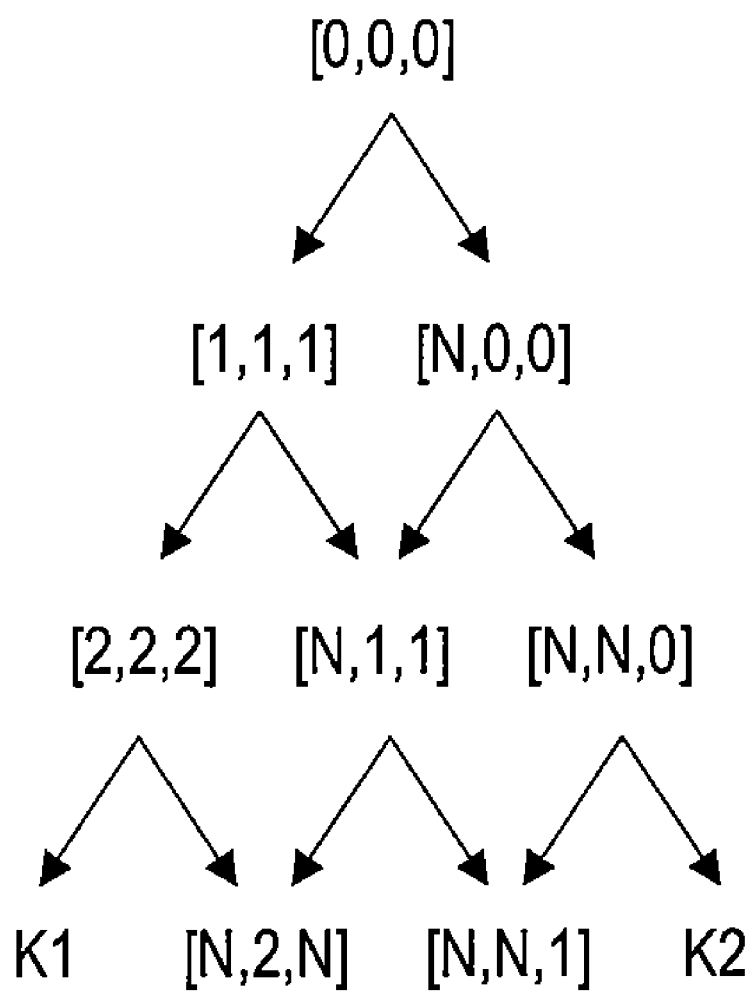
FIG. 6 is a diagram for illustrating an example of a node-keys-assigning chart for the example shown in FIG. 3.

If this method is applied to the directed graph described in FIG. 3, FIG. 6 is obtained. In FIG. 6, the initial key is less by one than that of FIG. 4, and both the calculation cost and the communication cost is reduced. K1 and K2 described in FIG. 6 are not given as the actual key derived from the initial key.

They are generated only from key information possessed by a node of [2, 2, 2] and a node of [N, N, 0], respectively. For example, K1 may be $H(H^2(x)\|H^2(y)\|H^2(z))$. As just performing the hash function only for the initial key x may allow other nodes to attack and generate K2, the generation of K2 is avoided by including a correction value R common to all the nodes in the data to be hashed. For example, K2=$H(z\|R)$. Here, the sign "$\|$" refers to a coupling of pieces of data.

[Key Derivation Method in the Time Sequential Contents]

Figure 7:
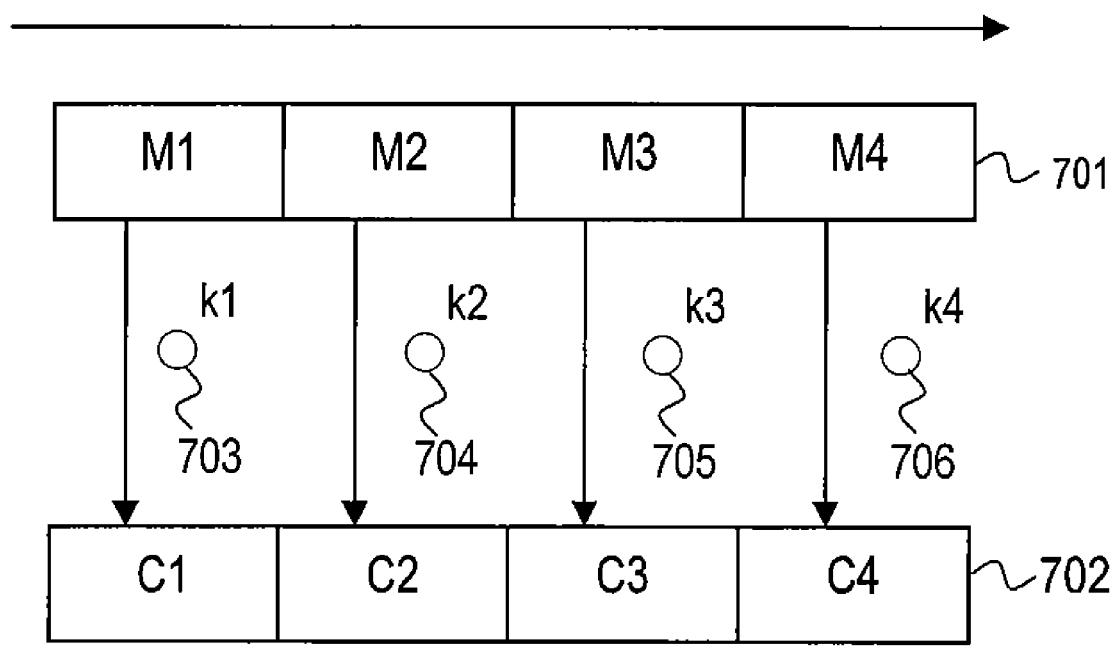
FIG. 7 is a schematic diagram for illustrating a case where time line contents are encrypted for each unit.

The abovementioned FIG. 7 is a schematic diagram for illustrating a case where time sequential contents are encrypted for each unit. It shows an example of contents to be managed divided into four of M1, M2, M3 and M4. Contents to be managed are encrypted by using contents keys k1, k2, k3 and k4 for each of atomic contents.

A range key k (i, j) (where i≦j), which allows only adjoining atomic contents to be decrypted will be considered.

Figure 8:
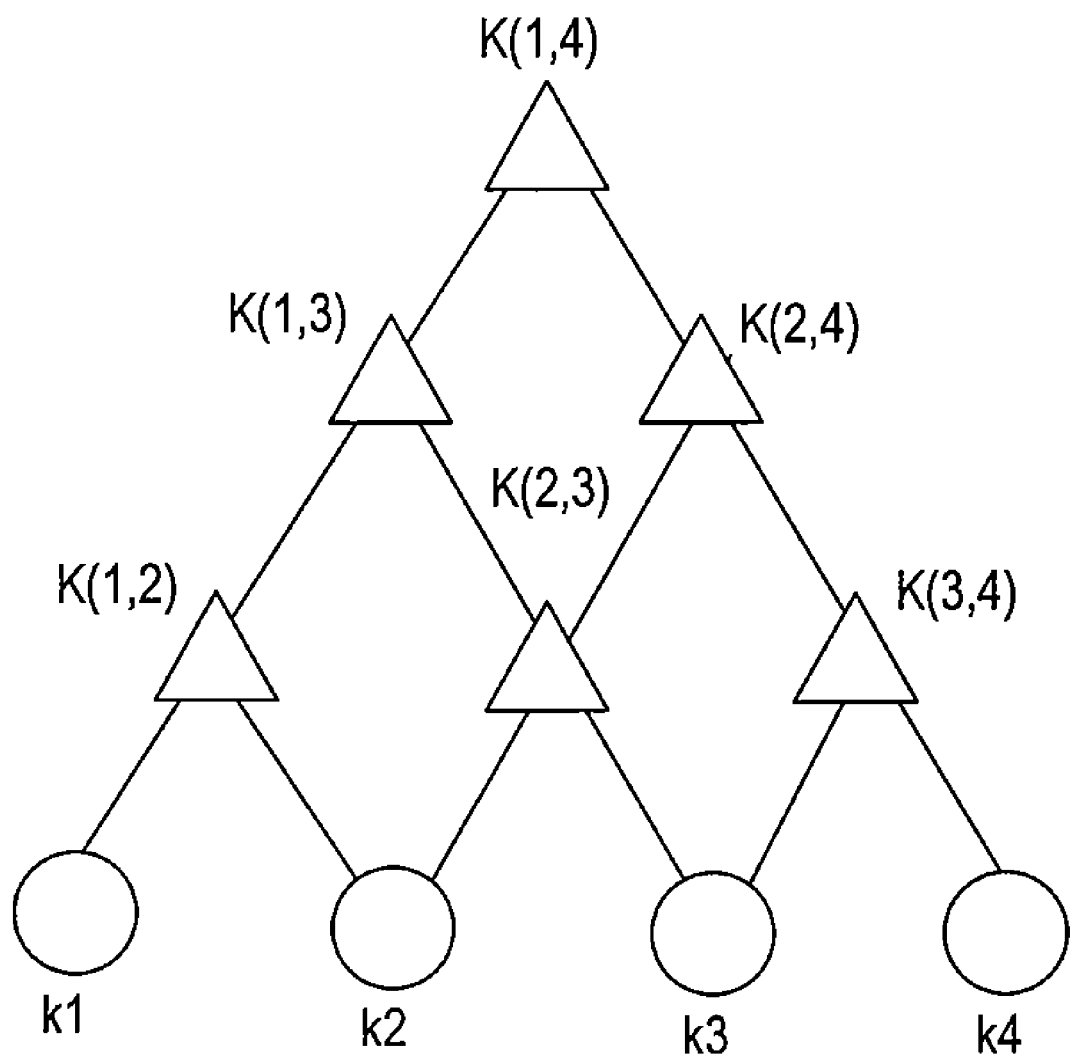
FIG. 8 is a diagram for illustrating a hierarchy of all the range keys shown in FIG. 7 according to the embodiment.

The range key k (i, j) is a key for allowing kj to be generated from contents key ki for atomic contents from Mi to Mj. FIG. 8 is a diagram for illustrating a hierarchy of all the range keys shown in FIG. 7. The nodes represented by circles at the bottom are contents keys. The contents key Ki can be considered the same as the range key K(i, i). Each node represented as a triangle is a range key, which can generate a range key and a contents key at the lower node position. The range key placed at the root is K(1, 4), which can decrypt all the four atomic contents.

When contents keys from k1 to kn are assigned to respective n contents to be managed from M1 to Mn, the range key K(i, j) for all the range (Mi, Mj) (where i<j) can be placed hierarchically in a directed graph. A directed graph is generated and applied to the conventional example of a hash key management method to assign a key to each node. Keys described in FIG. 4 or 6 can be assigned to FIG. 8. By using the hash key management method with each range key treated as a node of a directed graph enables key generation to be performed.

<Contents Delivery>

Assignment of range keys has been described. Next, re-delivery of contents will be described.

Figure 13:
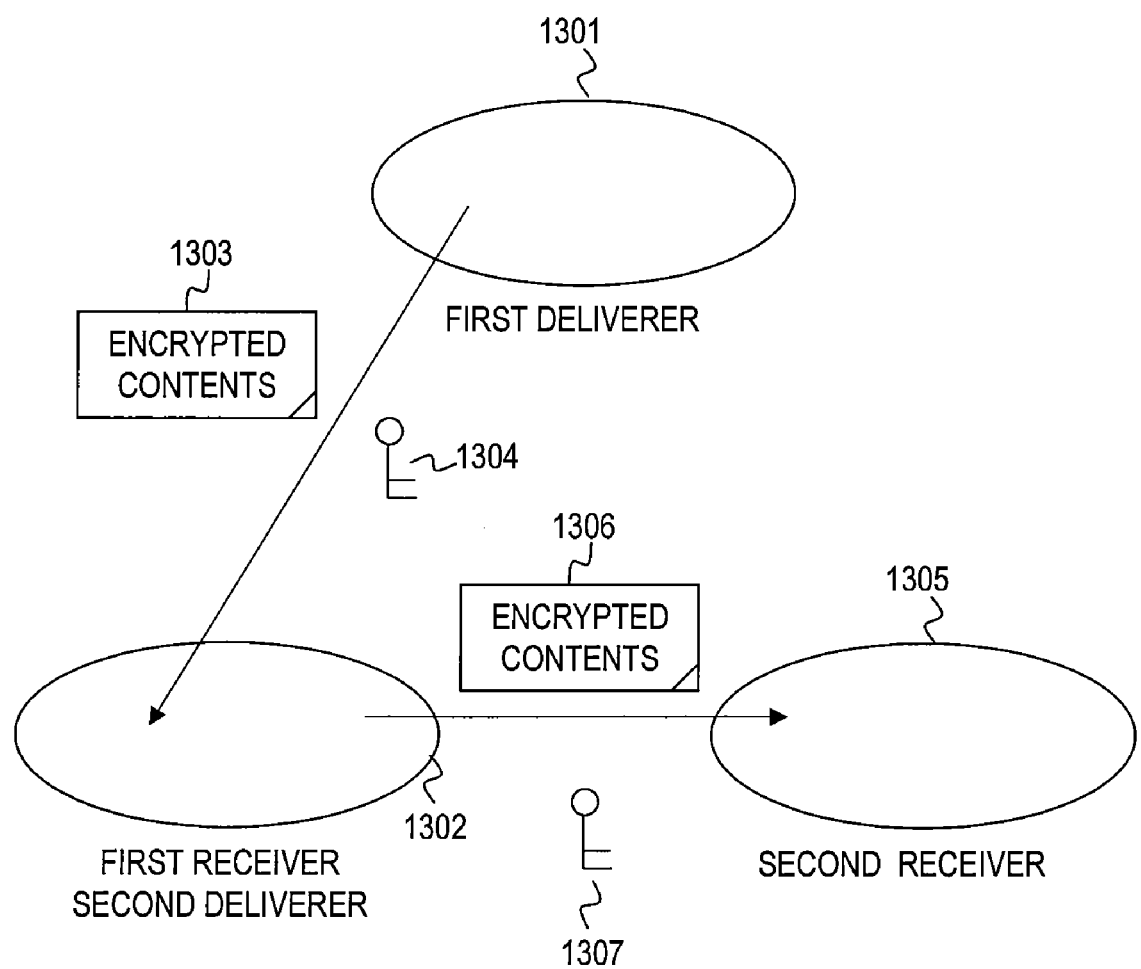
FIG. 13 is a diagram representing a contents delivery system according to the embodiment.
Figure 14:
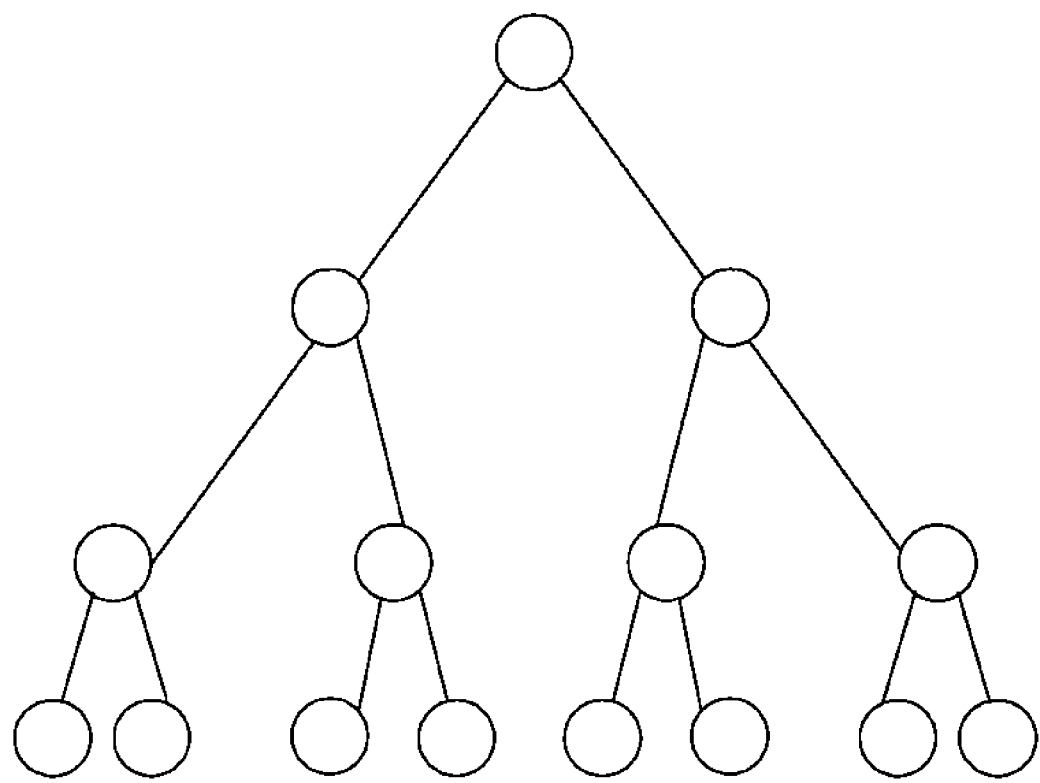
FIG. 14 is a conceptual diagram for illustrating a binary tree access structure in a tree structure management method.
Figure 15:
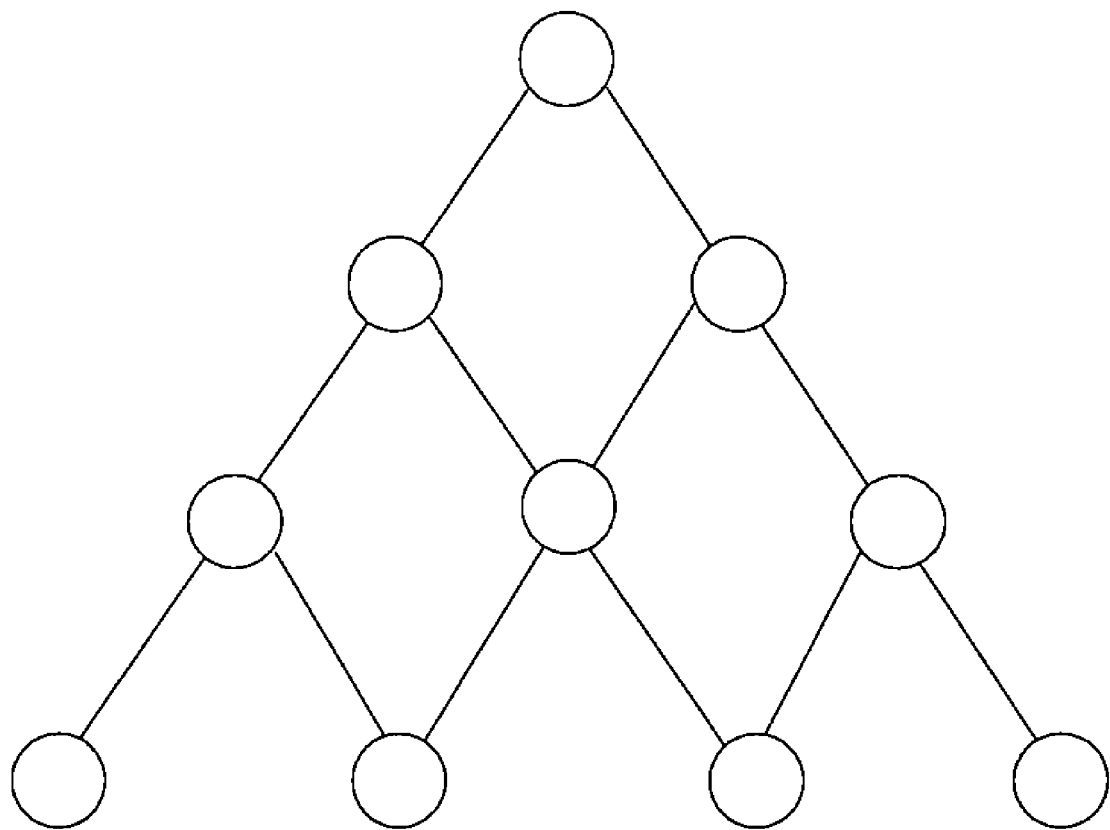
FIG. 15 is a conceptual diagram for illustrating an access structure in a hierarchical access control method.
Figure 16:
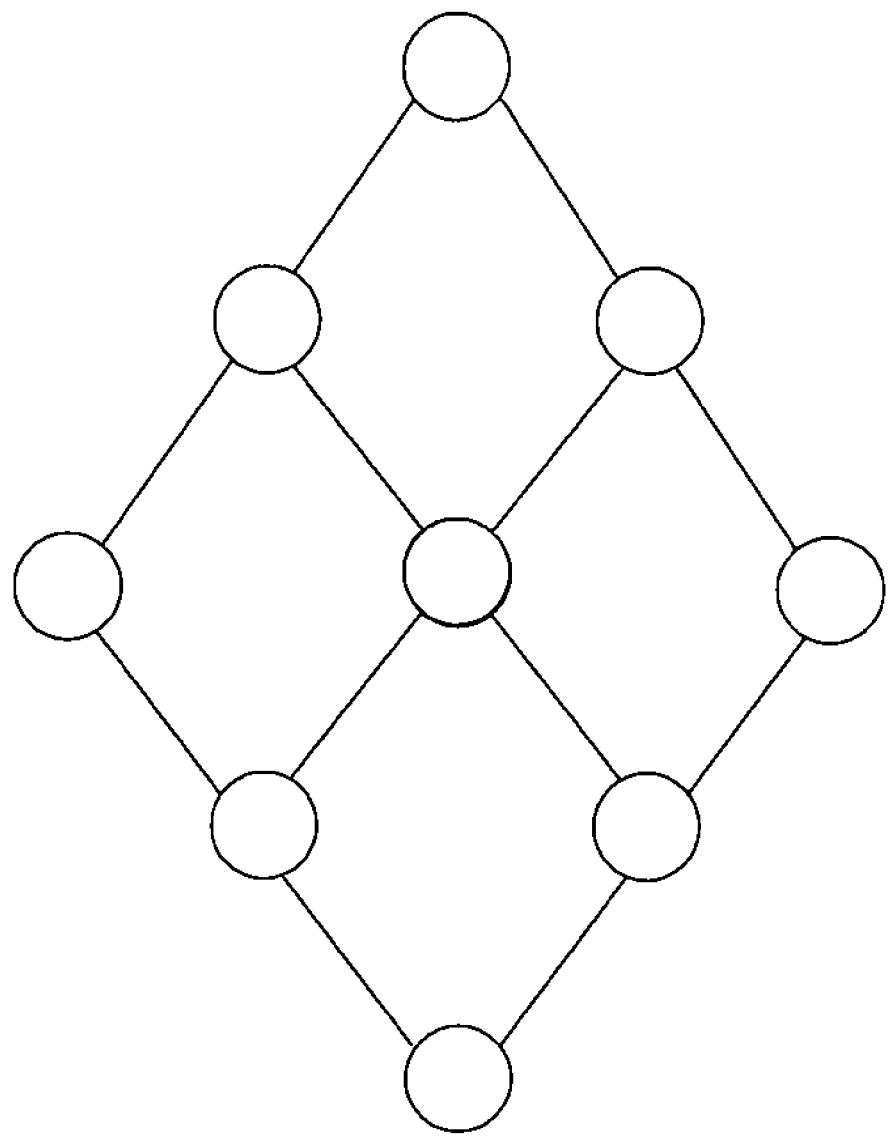
FIG. 16 is a conceptual diagram for illustrating an access structure in the hierarchical access control method.
Figure 17:
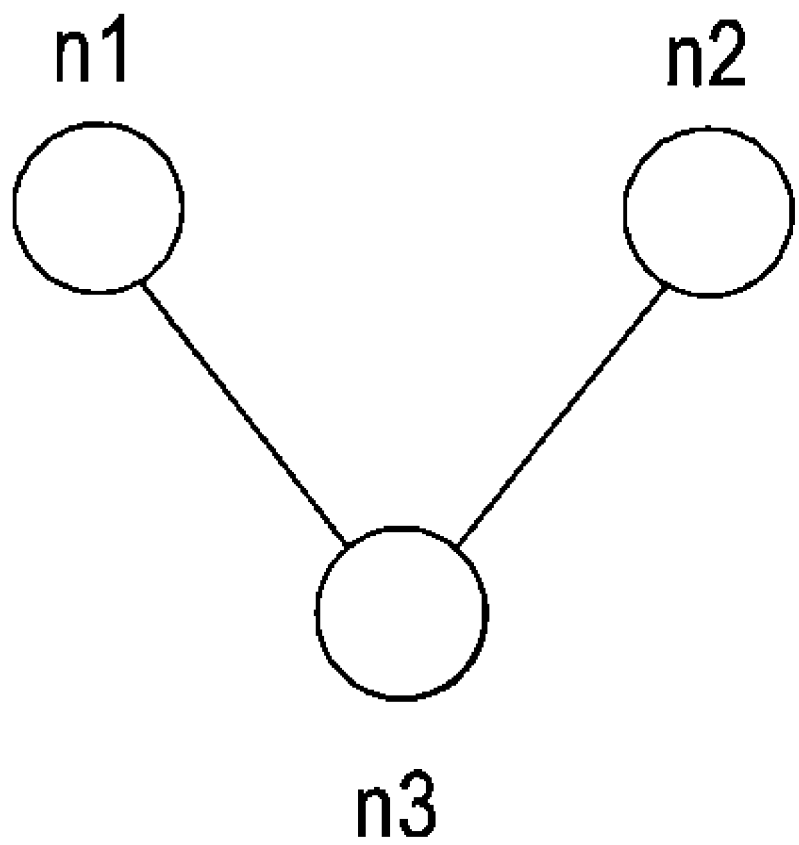
FIG. 17 is a conceptual diagram for illustrating a local structure in the hierarchical access control method.
Figure 19:
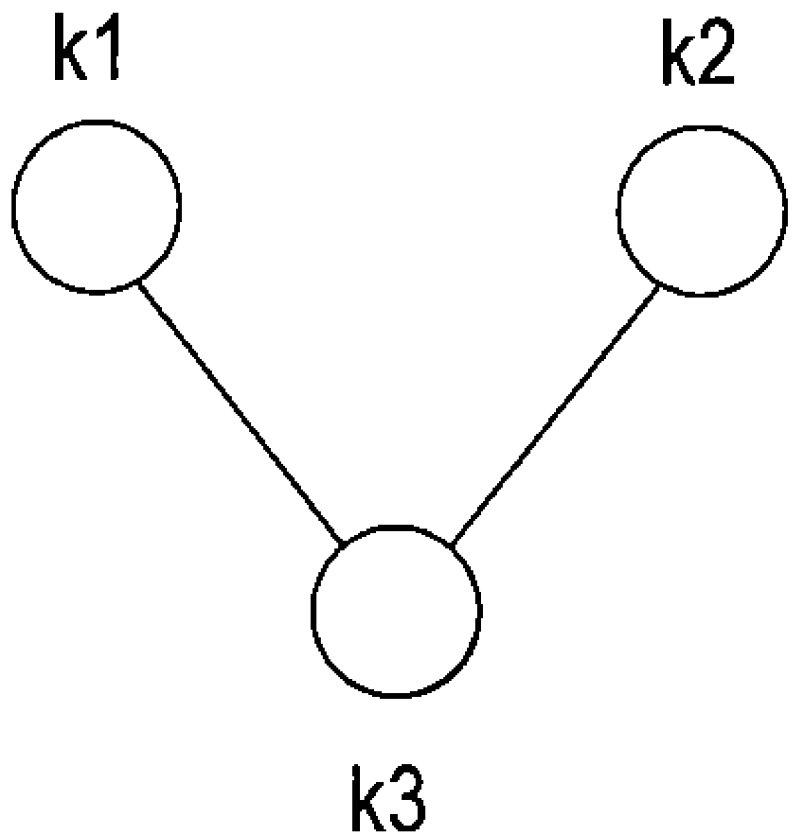
FIG. 19 is a diagram for illustrating One-way function based keying schemes.

FIG. 13 shows a delivery system in the embodiment. A first deliverer 1301 delivers encrypted contents 1303 in the abovementioned configuration and a range key 1304 for decrypting the contents 1303 to a first receiver 1302. The range key 1304 may be delivered separately from a third party such as a license server and not from the first deliverer 1301. The first receiver 1302 can decrypt a part of the encrypted contents 1303 with the range key 1304. The first receiver 1302 can re-deliver the contents. That is to say, the first receiver 1302 plays a role of the second deliverer and delivers the same encrypted contents 1306 to a second receiver 1305. The deliverer can calculate and send another range key 1307 placed below the range key 1304.

Specifically, a case can be considered where the range key 1304 is K(1,3) in FIG. 8 and another range key 1304 below is K (1, 2) in FIG. 8. As the first receiver 1302 has received the range key 1304 of K(1, 3), the first receiver 1302 can obtain contents M1, M2 and M3. The first receiver 1302 forms the range key 1307 so as to decrypt only M1 and M2, i.e., calculates K(1,2), and re-delivers it to the second receiver 1303. The receiver can re-deliver the contents by restricting the range the receiver is allowed to disclose. This means that a contents receiver also plays a role of a contents deliverer. The contents receiver also has a function of reforming a key at his own discretion.

A specific case of applying the abovementioned example will be described below. The HD drive 106 in the unit shown in FIG. 1 stores contents, for example a moving image data file, which the first deliverer 1301 wants to deliver.

Figure 23:
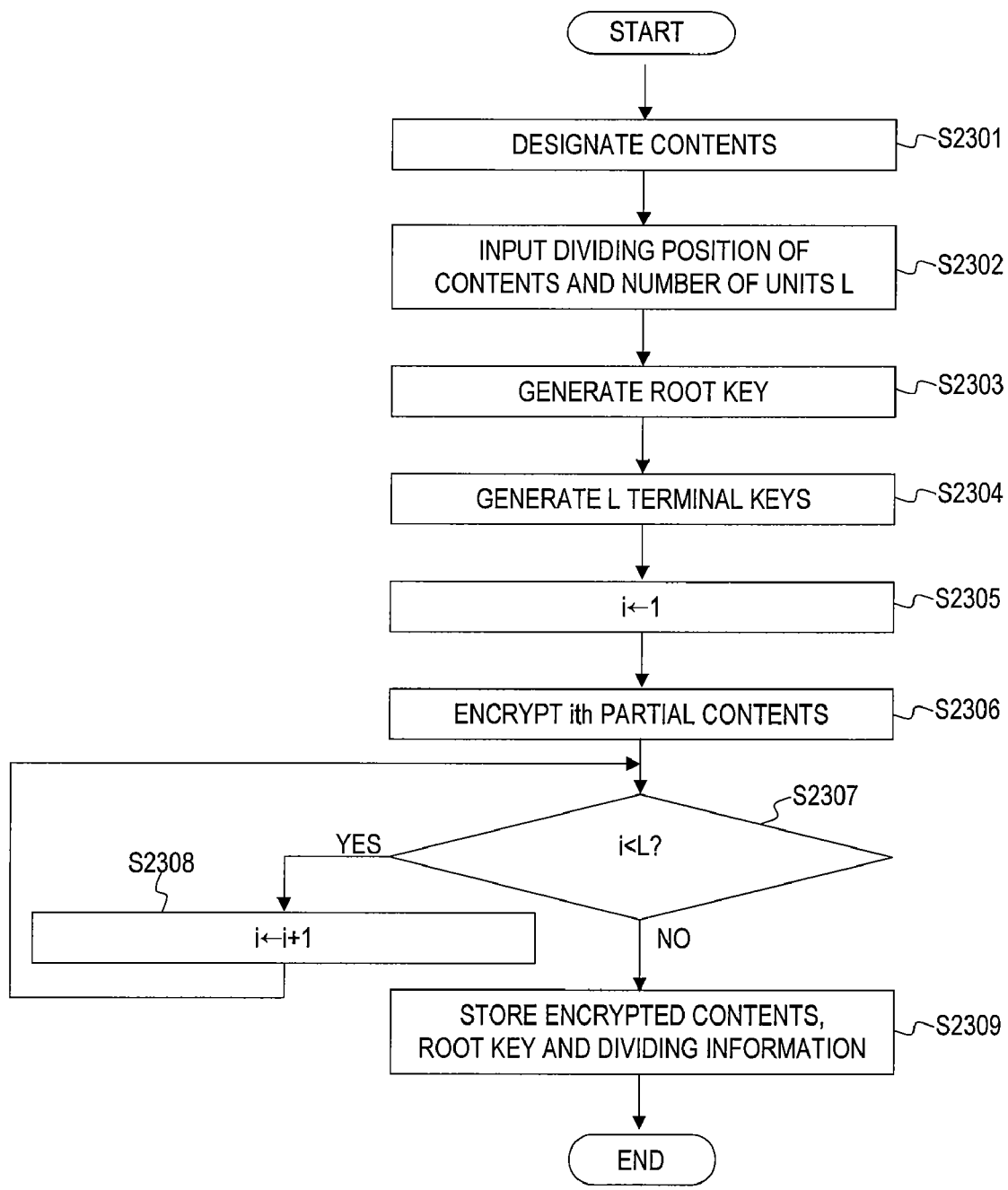
FIG. 23 is a flowchart for illustrating an encrypting procedure in the embodiment.

FIG. 23 shows a procedure of application programs for encryption (stored in the HD drive 106) in an embodiment.

First, at step S2301, a file to be encrypted is designated. The file can be designated with a file name with a path for the corresponding moving image file input from a keyboard, or with a file name designated on a dialog window for file designation in a manner of being traced back from a drive and a directory to the object file.

Then, at step S2302, a dividing position of the designated contents, i.e., an encrypting unit is input. As a method of inputting a dividing position may be a method of designating a boundary position of a moving image by time or a method of designating the position by chapter, if chapters are set. In some cases, the number of divisions for dividing the contents into equal parts may be input, when the contents are divided by the same time length. In any case, as the number of encrypting units set can be determined when the dividing position of the moving image file (contents) to be encrypted is designated, the number of units is set as L. Data between dividing positions are called partial contents here.

The process proceeds to step S2303, where the root key is generated based on key parameters, which are inputted via a keyboard by the number based on the dividing number L or previously stored in a key parameter file. The process proceeds to step S2304, where keys for L terminal nodes (contents keys) K1, K2, . . . KL are generated according to the above-mentioned procedure.

At step S2305, 1 is substituted into an initial variable i. The variable i is for indicating both partial contents to be encrypted and a key to be used.

At step S2306, $i^{th}$ partial contents are encrypted with a key $K_i$. If relationship i<L is satisfied, or it is determined that partial contents remains to be encrypted at step S2307, the variable i is incremented by 1 at step S2308 and the process of step S2306 is performed.

If it is determined that all the partial contents have been encrypted, the process proceeds to step S2309, where encrypted contents (here, an encrypted moving image file), a root key and dividing information indicating a dividing position of the encrypted contents (equal to dividing number) is stored in the HDD 106.

Figure 24:
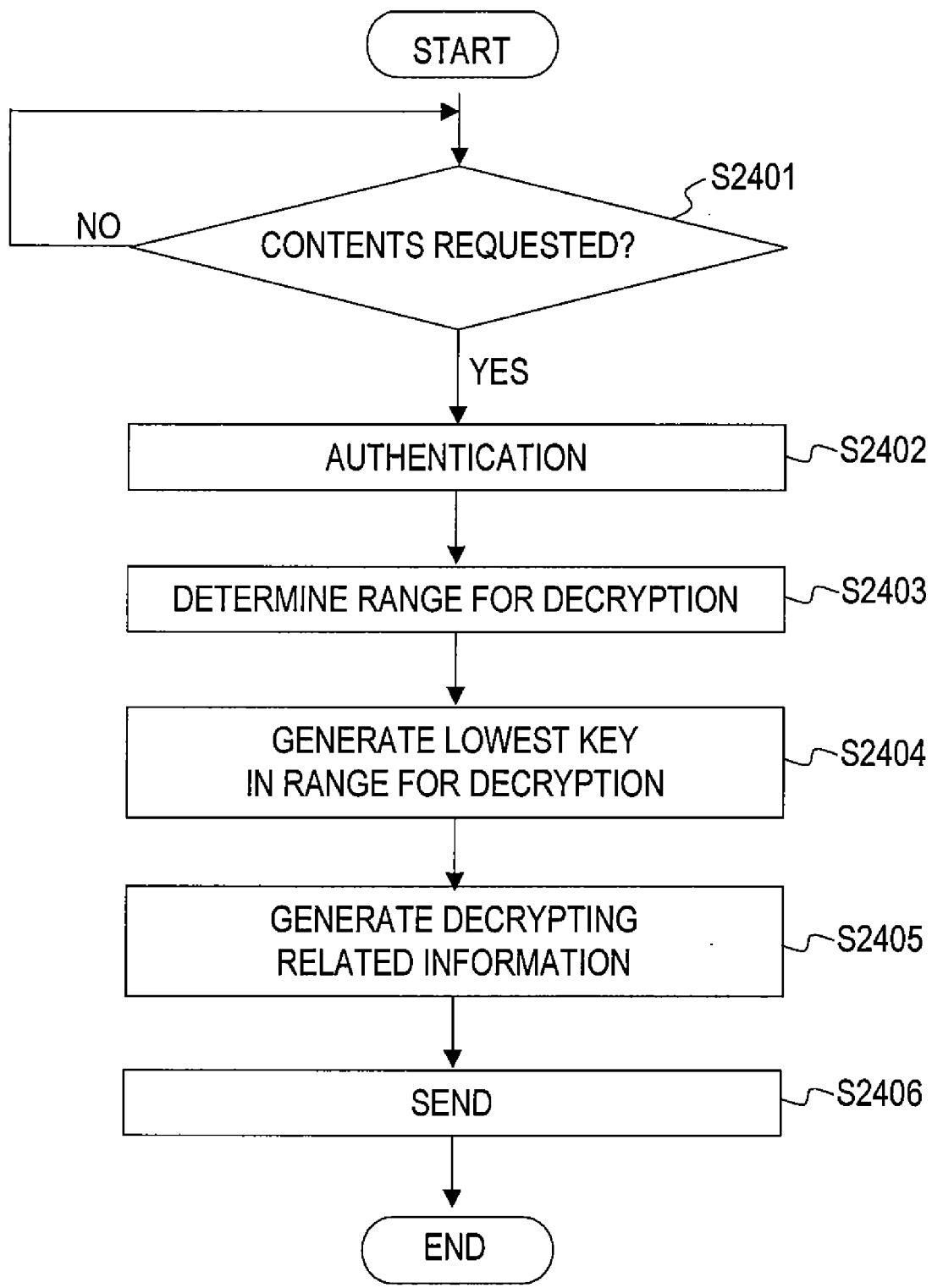
FIG. 24 is a flowchart for illustrating a delivery procedure of decrypting information for encrypted contents in the embodiment.

Next, delivery of encrypted contents will be described. As described above, although delivery of encrypted contents is desirably performed at a server intended for that purpose, the embodiment is described as the device of the first deliverer functions as a delivering device Web server, FTP server. The flowchart of FIG. 24 shows a procedure to be included in a server program.

First, whether contents are requested via a network or not is determined at step S2401. If contents are requested, the process proceeds to step S2402, where authentication is performed. Then, at step S2403, the range of the object contents (a start position and an end position of sequential partial contents) to be permitted for decryption is determined based on the authentication.

The process proceeds to step S2404, where key information on the lowest node among the nodes, which are the children node of all the nodes covered by the decrypting range, is generated on the basis of a root key for the entire contents held by a server. For example, in FIG. 8, in order to permit decryption of the second or the third partial contents, it is enough to generate keys K2 and K3. Thus, key K (2,3), which is for the lowest node among nodes whose children nodes are K2 and K3, is generated.

The process proceeds to step S2405, where decrypting related information is generated. The decrypting related information may be what shown in FIG. 25. That is to say, it may be the parent key information generated at step S2404, the number of children keys indicating how many pieces of children key information are generated from the parent key, the contents dividing information (described at FIG. 23) and information indicating the decrypting range.

At step S2406, the generated decrypting related information and the encrypted contents information are sent to the terminal of the requesting first receiver.

The encrypted contents information may be sent separately or delivered independently through the Internet. Thus, at step S2406, only the decrypting related information may be sent.

As a result, (the terminal of) the first receiver can determine not only how many times the children keys should be generated from the received parent key information but also which partial contents of the encrypted contents the generated children keys are corresponding to. Therefore, the first receiver can decrypt and replay the objective partial contents.

Although a moving image is taken as an example for the contents to be encrypted in the above example, the contents to be encrypted may be audio data or a document file. In case of a document file, pages forming the document may be considered as partial contents for processing. In such a case, however, a file structure of the document file may be disclosed. A typical document file is a PDF file.

As mentioned above, according to the embodiment, a data row forming the contents to be delivered is divided at desired positions and each of the partial contents between the dividing positions are encrypted with keys derived from the root key. As a result, the deliverer side has to manage only one key. This facilitates the key management and also allows generating key information for decrypting only the range of desired sequential partial contents at the deliverer side. The receiver side of the encrypted contents also has to manage only one piece of key information.

Second Embodiment

Range keys, which can be configured in any range, have been described in the above embodiment. In the present embodiment, a method for reducing key management cost by restricting the range keys will be described.

Figure 9:
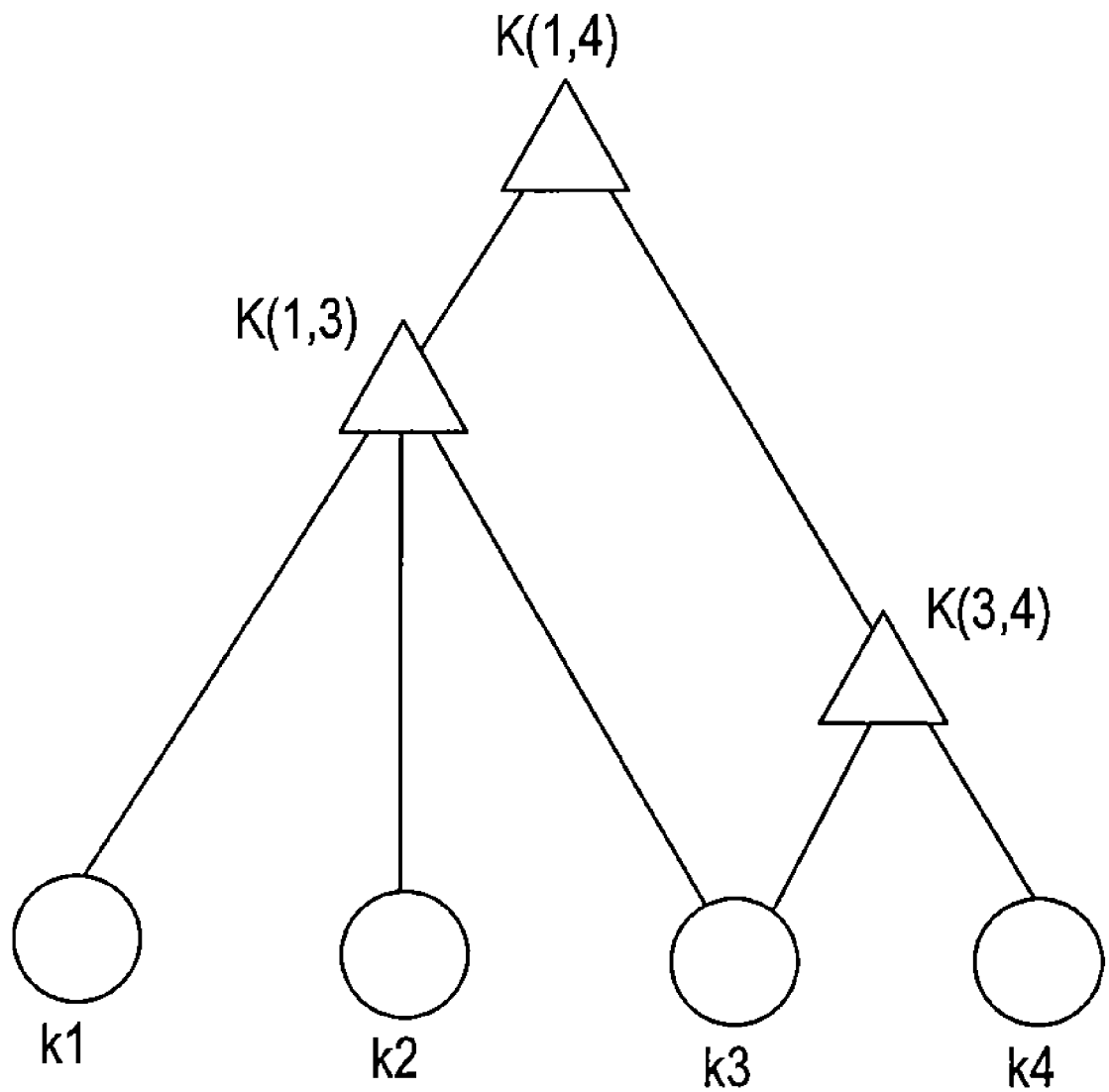
FIG. 9 is a diagram for illustrating a hierarchy of a part of the range keys shown in FIG. 7 according to a second embodiment.

FIG. 8 shows a hierarchy of all the range keys shown in FIG. 7. A case where not all the range keys are needed by the deliverer's intention can be considered. FIG. 9 shows the case where only K (1, 4), K (1, 3) and K (3, 4) are treated as range keys and it is recognized that the other range keys of K (2, 4), K (1, 2) and K (2, 3) will not used for key delivery. If the hash key generating method is applied for FIG. 9, the initial key is only two in the directed graph shown in FIG. 9 as the key delivery order is two except for nodes that can be pruned, while the initial key is three in FIG. 6. This embodiment can reduce both the amount of key data and the amount of key generating calculation by restricting range keys in this manner and deleting nodes of the directed graph.

This embodiment can reduce the total number of contents keys and reduce management cost by previously determining a range of contents to be managed in this manner and configuring mesh for dividing contents by unit different from general units.

Third Embodiment

A method of associating contents keys for the minimum unit of contents has been described in the second embodiment. In the present embodiment, a method of reducing key management cost by dividing contents after restricting range keys.

Figure 10:
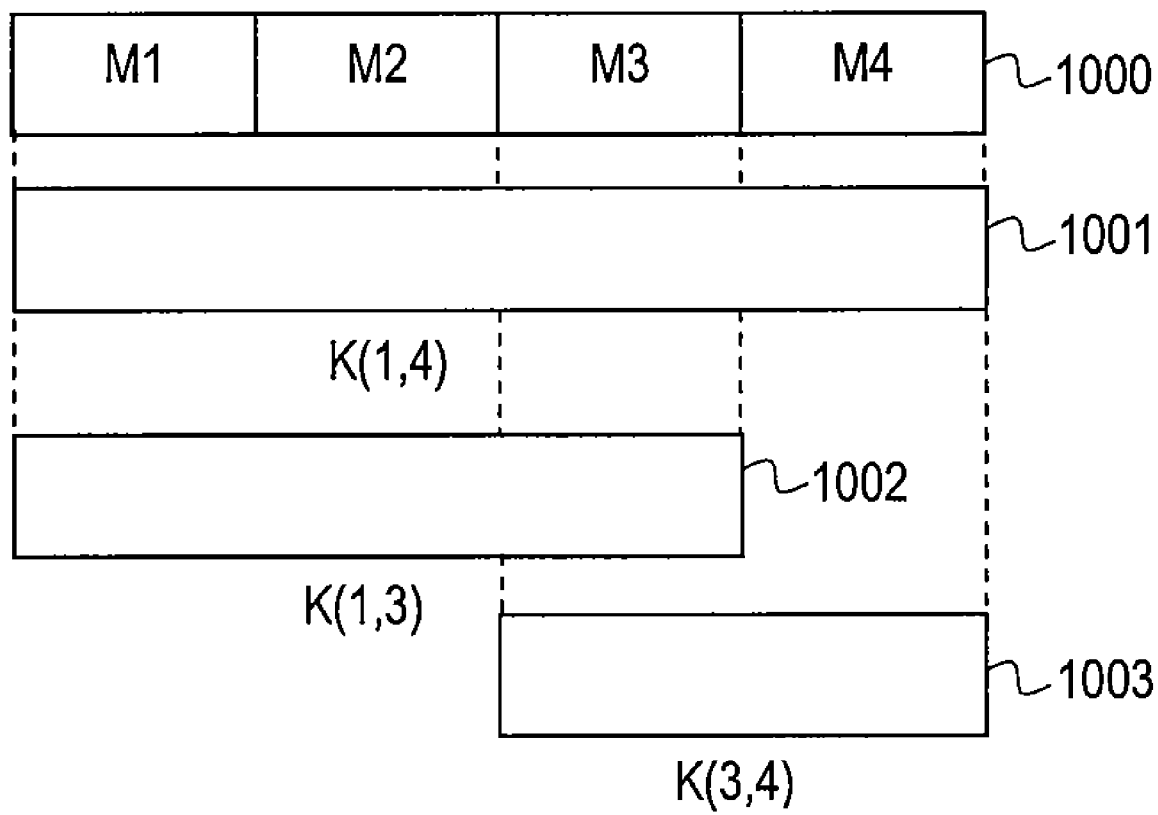
FIG. 10 is a diagram representing ranges to be decrypted in contents for range keys restricted in FIG. 9 according to the second embodiment.
Figure 11:
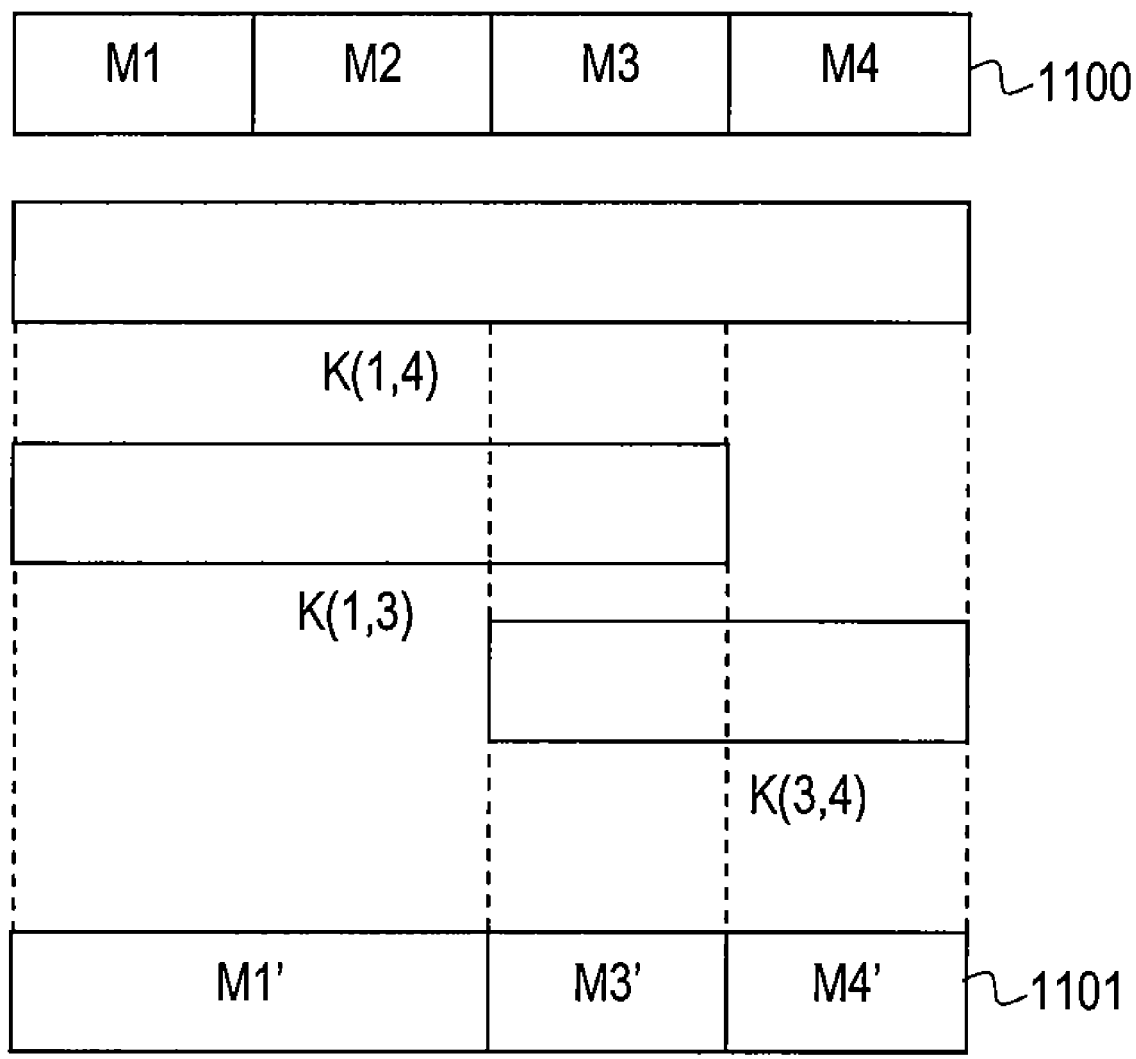
FIG. 11 is a diagram representing ranges to be decrypted in contents for range keys restricted in FIG. 10 according to a third embodiment.
Figure 12:
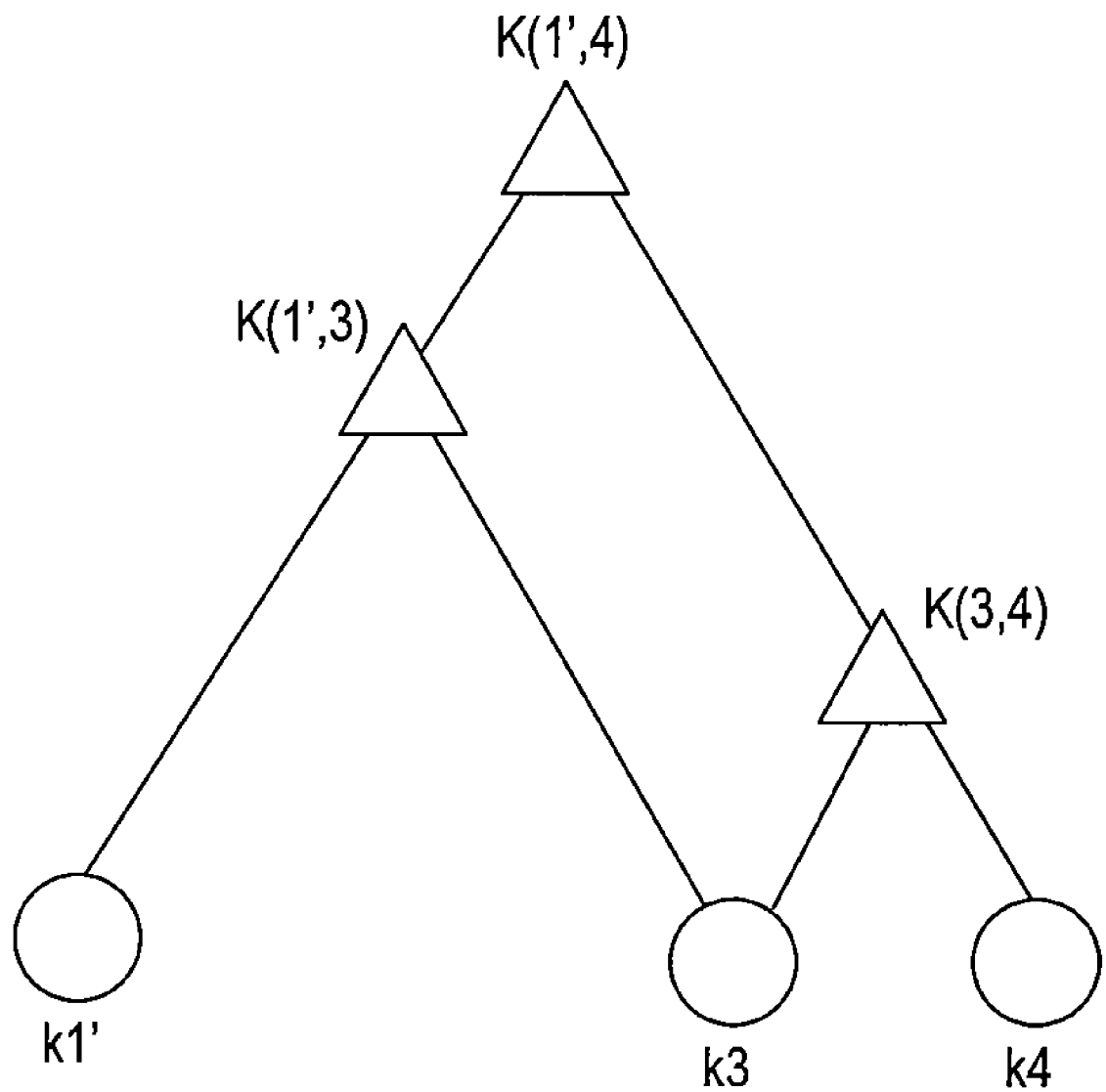
FIG. 12 is a diagram representing a hierarchy of a part of the range keys shown in FIG. 7 according to the third embodiment.

If range keys are restricted to what shown in FIG. 9, FIG. 10 shows ranges to be decrypted in contents corresponding to the ranges in FIG. 9. The contents to be managed 1000 includes M1 to M4, with the range keys 1001 to 1003 corresponding to M1 to M4, (M1, M3) and (M3, M4), respectively. As the minimum unit of contents forming respective ranges, the contents to be managed 1100 including M1 to M4 are enough to include three configurations as represented by 1101. In other words, this embodiment can reduce the total number of contents keys from four to three by integrating M1 and M2 into a atomic contents M1'. The hierarchy of range keys in this case is shown in FIG. 12.

Fourth Embodiment

In the Second Embodiment, a method of associating contents keys for the minimum unit of contents is described and the directed graph shown in FIG. 9 is generated from the directed graph shown in FIG. 8. In FIG. 9, two contents keys K (1, 3) and K (3, 4) share only one contents key (k3).

Figure 20:
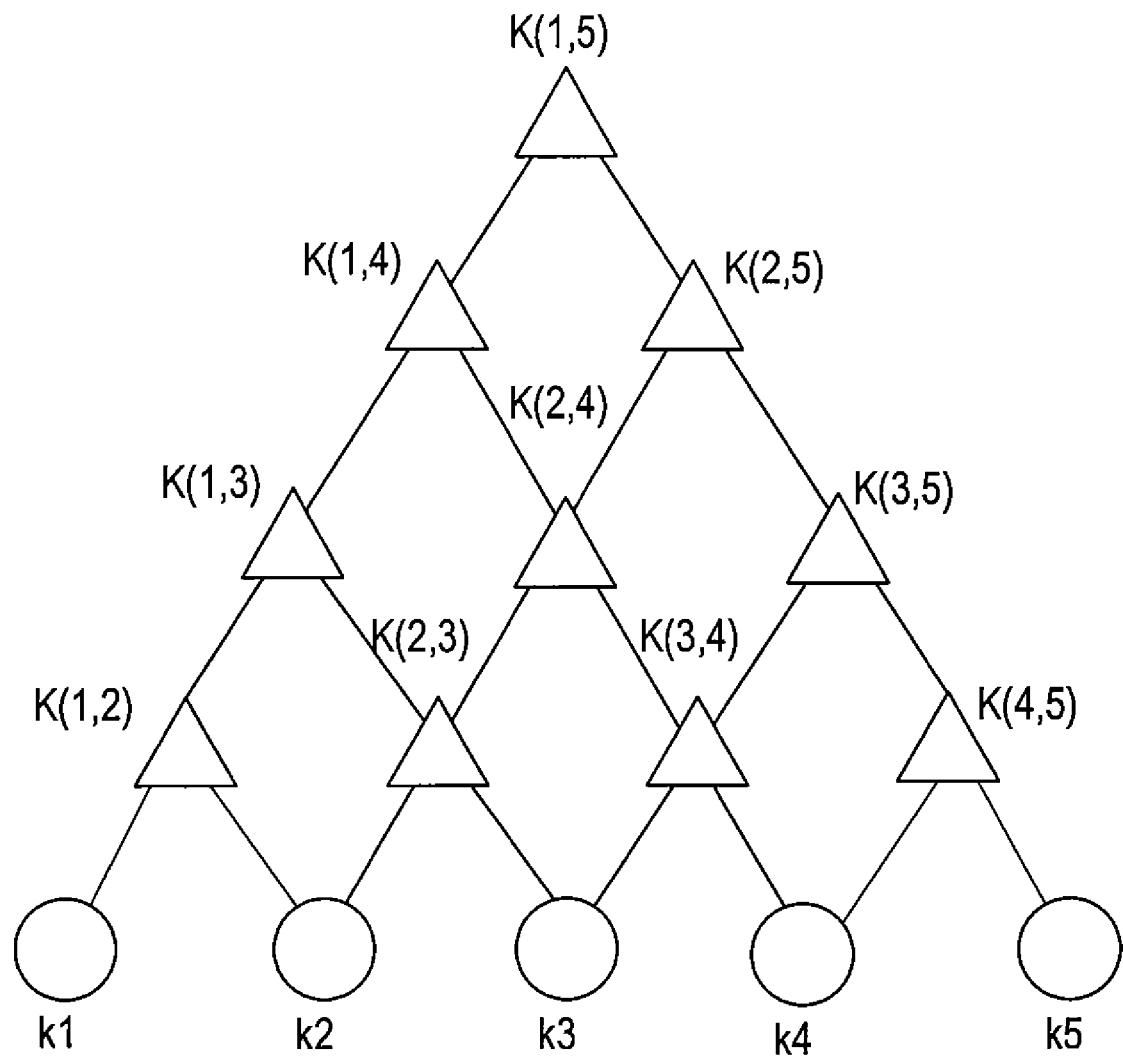
FIG. 20 is a diagram representing a hierarchy of all the range keys for five contents keys according to a fourth embodiment.
Figure 21:
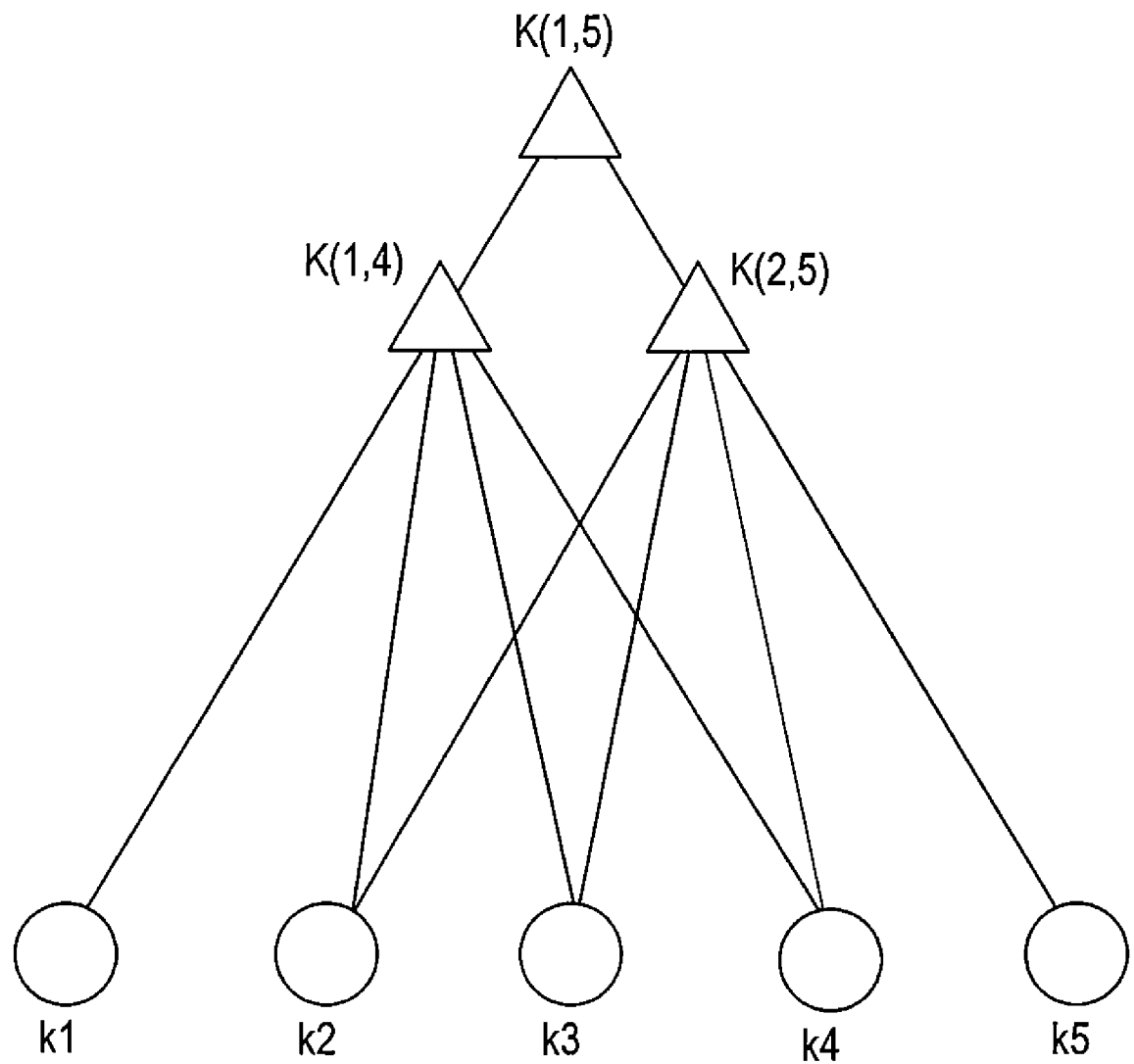
FIG. 21 is a diagram representing a hierarchy of a part of the range keys shown in FIG. 20 according to the fourth embodiment.

Here, a case of five contents keys as shown in FIG. 20 will be considered. The case where only K (1, 5), K (1, 4) and K (2, 5) are treated as range keys as shown in FIG. 21 by the deliverer's intention will be considered. Here, the contents keys shared by K (1, 4) and K (2, 5) are three of k2, k3 and k4. As the key delivery order is three except for nodes which can be pruned in the directed graph shown in FIG. 21, the initial key is three. The contents keys shared by two range keys are three even if range keys are two, which is considered ineffective. A method of reducing the number of initial keys by treating a range key for integrating the contents keys shared by range keys as a range key which can be delivered will be described.

Figure 22:
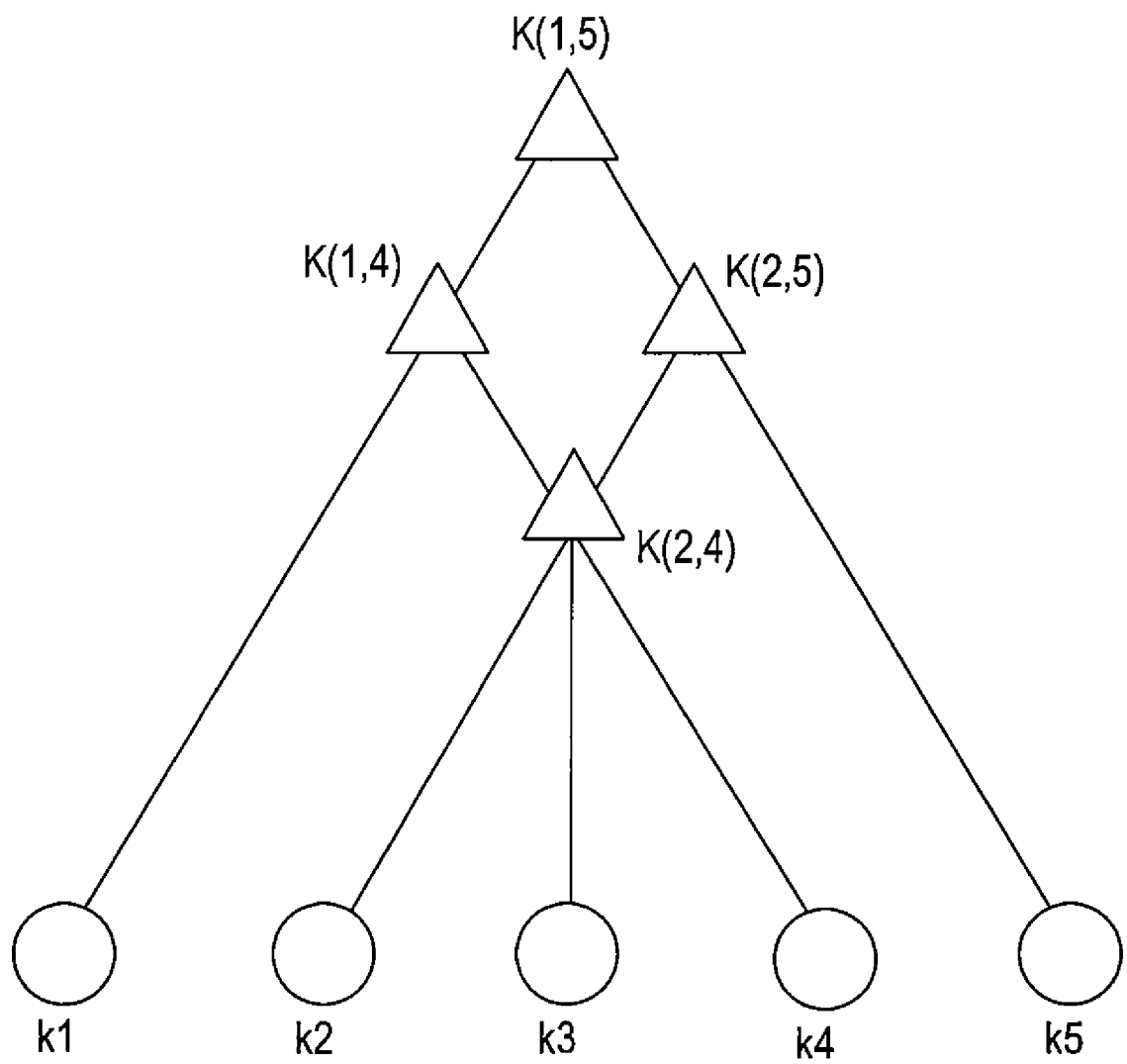
FIG. 22 is a diagram representing a hierarchy of a part of the range keys shown in FIG. 20 according to the fourth embodiment.

FIG. 22 is a directed graph added with K (2, 4). As the key delivery order is two except for nodes which can be pruned in this directed graph, the initial key is two. This embodiment can reduce the total number of contents keys and key management cost in this manner.

The Second and Fourth Embodiments have been described. Configuration and procedure of the apparatus according to the Second and the Fourth Embodiments are almost the same as those of the First Embodiment. As described in the First Embodiment, it is apparent that the present invention covers not only the time line contents such as a moving image, but also any contents with one-dimensional management axis such as page numbers or serial clause numbers in a general document. Therefore, the contents which can be divided into sub contents on the basis of some evaluating axis with the sub contents being ordered are included in the present invention.

The key information described in the embodiments are described as information on a key to be used both in encrypting and decrypting, though, different keys can be used for encrypting and decrypting like a secret key and a public key.

The present invention is not limited to the method of combining apparatuses and methods for achieving the abovementioned embodiments and methods described in the embodiments. The abovementioned embodiments implemented when program codes of software for implementing the abovementioned embodiment is provided to a computer (a CPU or an MPU) in the abovementioned system or apparatus and the computer of the abovementioned system or apparatus operates the abovementioned various devices according to the program codes can also be included in the present invention.

As the computer program can be generally executed when a computer readable storage medium such as a CD-ROM is set in a computer and copied or installed in the system, the computer readable storage medium can be included in the present invention.

According to the present invention as described above, contents information is considered to be configured by sequential partial contents. Even if partial contents are encrypted with different keys, the invention needs to store only one piece of key information, facilitating key management.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-254681 filed on Sep. 1, 2004, the entire contents of which are hereby incorporated by reference herein.

The invention claimed is:

1. An information processing apparatus for controlling access to moving image data, comprising:
inputting means for inputting dividing positions of the moving image data and a number L of divisions of the moving image data, wherein the moving image data is divided into L partial moving images in time series;
root key generating means for generating, corresponding to the number of partial moving images, L initial root keys $K_1$ to $K_L$ for a first layer in a directed graph having no loop and no cycle, where the $i^{th}$ ($1<i<L$) layer key in the directed graph includes i nodes;
first hierarchical structure key generating means which, if a number of applying times of a hash function to each of the initial root keys $K_1$ to $K_L$ is defined as elements $C_1$ to $C_L$ and a $j^{th}$ node key in an $i^{th}$ layer in the directed graph is defined as Sub_$G_{i,j}$($C_1, C_2, \ldots, C_L$),
(1) generates, for the node for the first layer, Sub_$G_{11}$(0, 0, . . . , 0) so as to set zero into all of elements $C_1$, $C_2, \ldots, C_L$,
(2) generates, for the first node in the $i^{th}$ layer ($2 \leq i \leq L$), Sub_$G_{i1}$( ) in which "i−1" is assigned to L−i+1 elements from the first element and "N" is assigned to else elements, whereby, as a result, Sub_$G_{i1}$(i−1, i−1, . . . , N, N) for the first node of the $i^{th}$ layer is generated, where "N" represents that the corresponding root key is not used,
(3) generates, for the end (or $i^{th}$) node in the $i^{th}$ layer ($2 \leq i \leq L$), Sub_$G_{ii}$( ) in which "N" is assigned to i−1 elements from the first element and "0" is assigned to else elements, whereby, as a result, Sub_$G_{ii}$(i−1, i−1, . . . , 0, 0) for the end node of the $i^{th}$ layer is generated, and
(4) generates, for $j^{th}$ node in $i^{th}$ layer ($2 \leq j \leq i-1$, and $3 \leq i \leq L$) excluding the first node and the end node in the $i^{th}$ layer, Sub_Gi,j( ) by deciding $k^{th}$ element ($1 \leq k \leq i$) in Sub_$G_{i,j}$( ) by comparing $k^{th}$ ($1 \leq n \leq L$) elements in Sub_$G_{i-1,j-1}$( ) and $G_{i-1,j}$( ) both of which are in one upper layer than the $i^{th}$ layer, and deciding the larger number as the $k^{th}$ element if both elements to be compared are not "N", while, deciding "N" as the $k^{th}$ element if at least one of the elements to be compared is "N";
encrypting means for generating L encryption keys by applying the hash function to each of the initial root keys $K_1$ to $K_L$ the number of times represented by each of elements in each of the generated node keys Sub_$G_{L1}$( ) to Sub_$G_{LL}$( ) of $L^{th}$ layer, and encrypting the moving image data using the generated L encryption keys by encrypting the $j^{th}$ ($1 \leq j \leq L$) partial moving image data using the $j^{th}$ encryption key;
storing means for storing encrypted moving image data encrypted by the encrypting means, the root keys $K_1$ to $K_L$, and information indicating the number L of divisions and the dividing positions of the moving image data;
determining means for determining a range of a portion which is permitted to be decrypted in the moving image data, where the range is defined by a start position and an end position;
second hierarchical structure key generating means for, based on the root keys $K_1$ to $K_L$ stored in said storing means, generating a node key, which is to be used for decrypting the range of the encrypted moving image data, of the lowest node among nodes which are ancestors of all the nodes, at the $L^{th}$ layer, corresponding to the range defined by the start position and the end position determined by said determining means;
generating means for generating decryption pertinent information including information related to the node key generated by said second hierarchical structure key generating means, information indicating how many children keys are generated from the node key, information indicating the number L of divisions and the dividing positions of the moving image data, and information indicating the start position and the end position of the portion in the moving image data; and
delivering means for delivering the encrypted moving image data and the decryption pertinent information.

2. A control method in an information processing apparatus for controlling access to moving image data, comprising:
an inputting step for inputting dividing positions of the moving image data and a number L of divisions of the moving image data, wherein the moving image data is divided into L partial moving images in time series;
root key generating step of generating, corresponding to the number of partial images, L initial root keys $K_1$ to $K_L$ for a first layer in a directed graph having no loop and no cycle, where the $i^{th}$ ($1<i<L$) layer key in the directed graph includes i nodes
first hierarchical structure key generating step which, if a number of applying times of a hash function to each of the initial root keys $K_1$ to $K_L$ is defined as elements $C_1$ to $C_L$ and a $j^{th}$ node key in an $i^{th}$ layer in the directed graph is defined as Sub_$G_{i,j}$($C_1, C_2, \ldots, C_L$),
(1) generates, for the node for the first layer, Sub_$G_{11}$(0, 0, . . . , 0) so as to set zero into all of elements $C_1$, $C_2, \ldots, C_L$,
(2) generates, for the first node in the $i^{th}$ layer ($2 \leq i \leq L$), Sub_$G_{i1}$( ) in which "i−1" is assigned to L−i+1 elements from the first element and "N" is assigned to else elements, whereby, as a result, Sub_$G_{i1}$(i−1, i−1, . . . , N, N) for the first node of the $i^{th}$ layer is generated, where "N" represents that the corresponding root key is not used,
(3) generates, for the end (or $i^{th}$) node in the $i^{th}$ layer ($2 \leq i \leq L$), Sub_$G_{ii}$( ) in which "N" is assigned to i−1 elements from the first element and "0" is assigned to else elements, whereby, as a result, Sub_$G_{ii}$(i−1, i−1, . . . , 0, 0) for the end node of the $i^{th}$ layer is generated, and
(4) generates, for $j^{th}$ node in $i^{th}$ layer ($2 \leq j \leq i-1$, and $3 \leq i \leq L$) excluding the first node and the end node in the $i^{th}$ layer, Sub_Gi,j( ) by deciding $k^{th}$ element ($1 \leq k \leq i$) in Sub_$G_{i,j}$( ) by comparing $k^{th}$ ($1 \leq n \leq L$) elements in Sub_$G_{i-1,j-1}$( ) and $G_{i-1,j}$( ) both of which are in one upper layer than the $i^{th}$ layer, and deciding the larger number as the $k^{th}$ element if both elements to be compared are not "N", while, deciding "N" as the $k^{th}$ element if at least one of the elements to be compared is "N";

an encrypting step of generating L encryption keys by applying the hash function to each of the initial root keys $K_1$ to $K_L$ the number of times represented by each of elements in each of the generated node keys Sub_$G_{L1}$( ) to Sub_$G_{LL}$( ) of $L^{th}$ layer, and encrypting the moving image data using the generated L encryption keys by encrypting the $j^{th}$ ($1 \leq j \leq L$) partial moving image data using the $j^{th}$ encryption key;

a storing step of storing encrypted moving image data encrypted by the encrypting step, the root keys $K_1$ to $K_L$ and information indicating the number L of divisions and the dividing positions of the moving image data;

a determining step of determining a range of a portion which is permitted to be decrypted in the moving image data, where the range is defined by a start position and an end position;

a second hierarchical structure key generating step of, based on the root keys $K_1$ to $K_L$ key stored in said storing step, generating a node key, which is to be used for decrypting the range of the encrypted moving image data, of the lowest node among nodes which are ancestors of all the nodes, at the $L^{th}$ layer, corresponding to the range defined by the start position and the end position determined by said determining means;

a generating step of generating decryption pertinent information including information related to the node key generated by said second hierarchical structure key generating step, information indicating how many children keys are generated from the node key, information indicating the number L of divisions and the dividing positions of the moving image data, and information indicating the start position and the end position of the portion in the moving image data; and a delivering step of delivering the encrypted moving image data and the decryption pertinent information.

3. A non-transitory computer-readable storage medium embodying a computer program that causes an apparatus to function as an information processing apparatus for controlling access to moving image data, when executed by a computer, wherein said computer program functions as:

inputting means for inputting dividing positions of the moving image data and a number L of divisions of the moving image data, wherein the moving image data is divided into L partial moving images in time series;

root key generating means for generating, corresponding to the number of partial images, L initial root keys $K_1$ to $K_L$ for a first layer in a directed graph having no loop and no cycle, where the $i^{th}$ ($1<i<L$) layer key in the directed graph includes i nodes, first hierarchical structure key generating means which, if a number of applying times of a hash function to each of the initial root keys $K_1$ to $K_L$ is defined as elements $C_1$ to $C_L$ and a $j^{th}$ node key in the $i^{th}$ layer in the directed graph is defined as Sub_$G_{i,j}$ ($C_1, C_2, \ldots, C_L$), (1) generates, for the node for the first layer, Sub_$G_{11}$(0, 0, . . . , 0) so as to set zero into all of elements $C_1, C_2, \ldots, C_L$, (2) generates, for the first node in the $i^{th}$ layer ($2 \leq i \leq L$), Sub_$G_{i1}$( ) in which "i−1" is assigned to L−i+1 elements from the first element and "N" is assigned to else elements, whereby, as a result, Sub_$G_{i1}$(i−1, i−1, . . . , N, N) for the first node of the $i^{th}$ layer is generated, where "N" represents that the corresponding root key is not used, (3) generates, for the end (or $i^{th}$) node in the $i^{th}$ layer ($2 \leq i \leq L$), Sub_$G_{ii}$( ) in which "N" is assigned to i−1 elements from the first element and "0" is assigned to else elements, whereby, as a result, Sub_$G_{ii}$(i−1, i−1, . . . , 0, 0) for the end node of the $i^{th}$ layer is generated, and (4) generates, for $j^{th}$ node in $i^{th}$ layer ($2 \leq j \leq i-1$, and $3 \leq i \leq L$) excluding the first node and the end node in the $i^{th}$ layer, Sub_$G_{i,j}$( ) by deciding $k^{th}$ element ($1 \leq k \leq i$) in Sub_$G_{i,j}$( ) by comparing $k^{th}$ ($1 \leq n \leq L$) elements in Sub_$G_{i-1,j-1}$( ) and $G_{i-1,j}$( ) both of which are in one upper layer than the $i^{th}$ layer, and deciding the larger number as the $k^{th}$ element if both elements to be compared are not "N", while, deciding "N" as the $k^{th}$ element if at least one of the elements to be compared is "N";

encrypting means for generating L encryption keys by applying the hash function to each of the initial root keys $K_1$ to $K_L$ the number of times represented by each of elements in each of the generated node keys Sub_$G_{L1}$( ) to Sub_$G_{LL}$( ) of $L^{th}$ layer, and encrypting the moving image data using the generated L encryption keys by encrypting the $j^{th}$ ($1 \leq j \leq L$) partial moving image data using the $j^{th}$ encryption key;

storing means for storing encrypted moving image data encrypted by the encrypting means, the root keys $K_1$ to $K_L$, and information indicating the number L of divisions and the dividing positions of the moving image data;

determining means for determining a range of a portion which is permitted to be decrypted in the moving image data, where the range is defined by a start position and an end position;

second hierarchical structure key generating means for, based on the root keys $K_1$ to $K_L$ stored in said storing means, generating a node key, which is to be used for decrypting the range of the encrypted moving image data, of the lowest node among nodes which are ancestors of all the nodes, at the $L^{th}$ layer, corresponding to the range defined by the start position and the end position determined by said determining means;

generating means for generating decryption pertinent information including information related to the node key generated by said second hierarchical structure key generating means, information indicating how many children keys are generated from the node key, information indicating the number L of divisions and the dividing positions of the moving image data, and information indicating the start position and the end position of the portion in the moving image data; and delivering means for delivering the encrypted moving image data and the decryption pertinent information.

* * * * *